(12) United States Patent
Masuda et al.

(10) Patent No.: US 8,511,903 B2
(45) Date of Patent: Aug. 20, 2013

(54) WHEEL BEARING DEVICE AND MANUFACTURING METHOD THEREFOR

(75) Inventors: Yoshinori Masuda, Toyota (JP); Tatsuya Yokota, Toyota (JP); Motonori Nakao, Kashiwara (JP)

(73) Assignee: JTEKT Corporation, Osaka (JP)

( * ) Notice: Subject to any disclaimer, the term of this patent is extended or adjusted under 35 U.S.C. 154(b) by 220 days.

(21) Appl. No.: 12/704,221

(22) Filed: Feb. 11, 2010

(65) Prior Publication Data

US 2010/0209034 A1    Aug. 19, 2010

(30) Foreign Application Priority Data

| Feb. 17, 2009 | (JP) | 2009-034583 |
| Feb. 17, 2009 | (JP) | 2009-034603 |
| Feb. 17, 2009 | (JP) | 2009-034604 |
| Feb. 17, 2009 | (JP) | 2009-034605 |
| Feb. 10, 2010 | (JP) | 2010-027676 |

(51) Int. Cl.
*F16C 13/00* (2006.01)
*B21D 22/00* (2006.01)

(52) U.S. Cl.
USPC .................. 384/544; 384/589; 72/358

(58) Field of Classification Search
USPC ............ 384/544, 589; 29/898; 72/352, 72/358, 359; 301/105.1
See application file for complete search history.

(56) References Cited

U.S. PATENT DOCUMENTS

| 1,410,093 | A | * | 3/1922 | Dallmeyer et al. | 72/356 |
| 5,077,003 | A | | 12/1991 | Muraoka et al. | |
| 6,524,012 | B1 | * | 2/2003 | Uchman | 384/544 |
| 7,267,487 | B2 | * | 9/2007 | Ishikawa | 384/450 |
| 2005/0018939 | A1 | | 1/2005 | Niwa et al. | |
| 2006/0117903 | A1 | | 6/2006 | Kobayashi et al. | |

(Continued)

FOREIGN PATENT DOCUMENTS

| EP | 1 647 418 A2 | 4/2006 |
| EP | 1 970 141 A1 | 9/2008 |

(Continued)

OTHER PUBLICATIONS

Extended European Search Report issued by the European Patent Office in European Patent Application No. 10 15 3659 on Mar. 31, 2010.

(Continued)

*Primary Examiner* — Thomas R Hannon
*Assistant Examiner* — Adam D Rogers
(74) *Attorney, Agent, or Firm* — Oliff & Berridge, PLC

(57) ABSTRACT

A wheel bearing device of the invention includes a flanged shaft member that includes a shaft portion to which a rolling bearing is assembled, a fitting shaft portion that is formed on one end side of the shaft portion and that is fitted to a center hole of a wheel, and a plurality of flange portions that extend radially outward on an outer peripheral surface located between the shaft portion and the fitting shaft portion and each of which has a through bolt hole in which a hub bolt for fastening the wheel is arranged. Each flange portion of the wheel bearing device is formed by side extrusion when a forged recess is formed at a center of an end surface of the fitting shaft portion by cold forging. An edge portion of a cross-sectional shape taken perpendicularly to a longitudinal direction of each flange portion is formed in an R-chamfered shape.

8 Claims, 20 Drawing Sheets

(56) References Cited

U.S. PATENT DOCUMENTS

| | | |
|---|---|---|
| 2009/0263065 A1 | 10/2009 | Kobayashi et al. |
| 2010/0058591 A1* | 3/2010 | Kobayashi et al. ............. 29/898 |
| 2010/0210369 A1* | 8/2010 | Masuda et al. ................ 464/179 |

FOREIGN PATENT DOCUMENTS

| | | |
|---|---|---|
| EP | 2 141 254 A1 | 1/2010 |
| EP | 2221194 A1 * | 8/2010 |
| JP | A-H02-209452 | 8/1990 |
| JP | A-5-76979 | 3/1993 |
| JP | A-2003-25803 | 1/2003 |
| JP | A-2005-59832 | 3/2005 |
| JP | A-2006-111070 | 4/2006 |
| JP | A-2006-123890 | 5/2006 |
| JP | A-2006-142916 | 6/2006 |
| JP | A-2007-084882 | 4/2007 |
| JP | A-2007-145203 | 6/2007 |
| JP | A-2007-152413 | 6/2007 |
| JP | A-2007-237958 | 9/2007 |
| JP | A-2008-036679 | 2/2008 |
| JP | A-2008-37272 | 2/2008 |
| JP | A-2008-194742 | 8/2008 |
| JP | A-2008-229671 | 10/2008 |
| JP | A-2008-266768 | 11/2008 |
| WO | WO 2007/066634 A1 | 6/2007 |
| WO | WO 2008/018439 A1 | 2/2008 |

OTHER PUBLICATIONS

Jan. 1, 2013 Office Action issued in European Patent Application No. 10153659.7.

Apr. 23, 2013 Office Action issued in Japanese Patent Application No. 2009-034603 (English translation only).

Jun. 4, 2013 Office Action issued in Japanese Patent Application No. 2009-034604 (with translation).

* cited by examiner

F I G . 12
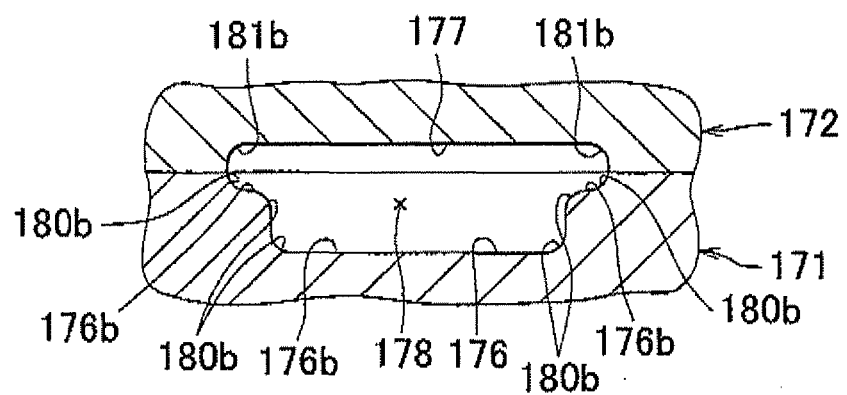

F I G. 20
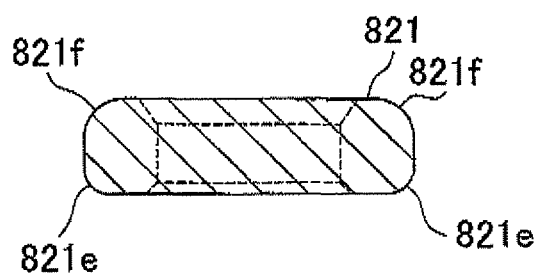

WHEEL BEARING DEVICE AND MANUFACTURING METHOD THEREFOR

INCORPORATION BY REFERENCE

The disclosure of Japanese Patent Applications No. 2009-034583 filed on Feb. 17, 2009, No. 2009-034603 filed on Feb. 17, 2009, No. 2009-034604 filed on Feb. 17, 2009, No, 2009-034605 filed on Feb. 17, 2009 and No. 2010-27676 filed on Feb. 10, 2010 including the specifications, drawings and abstracts are incorporated herein by reference in its entirety.

BACKGROUND OF THE INVENTION

1. Field of the Invention

The invention relates to a wheel bearing device and a manufacturing method therefor.

2. Description of the Related Art

There is a wheel bearing device that includes a flanged shaft member (which may also be called hub wheel). The flanged shaft member has a shaft portion, a fitting shaft portion and a plurality of flange portions. A rolling bearing is assembled to the shaft portion. The fitting shaft portion is formed on one end of the shaft portion, and has a larger diameter than that of the shaft portion. A center hole of a wheel is fitted onto the fitting shaft portion. The plurality of flange portions extend radially outward on an outer peripheral surface located between the shaft portion and the fitting shaft portion. Each of the plurality of flange portions has a through bolt hole in which a hub bolt for fastening the wheel is arranged.

The thus configured wheel bearing device is, for example, described in Japanese Patent Application Publication No. 2003-25803 (JP-A-2003-25803).

In this wheel bearing device, a flanged shaft member (hub wheel) is shaped by cold forging using a cylindrical tube as a base material, and a plurality of circumferential portions of one shaft end portion of the cold-forged base material are cut and raised radially outward. Thus, a plurality of flange portions (raised pieces) are formed. Then, a fitting shaft portion (to which a wheel is fitted to be positioned) formed of a plurality of tongue pieces is provided at the one shaft end portion of the base material. The plurality of tongue pieces extending in the axial direction are left between the plurality of flange portions.

Incidentally, in the existing wheel bearing device described in JP-A-2003-25803, a flanged shaft member is configured so that the plurality of flange portions formed of raised pieces are formed at the one shaft end portion of a forging shaped by cold forging using a cylindrical tube as a base material.

By so doing, it is possible to reduce the weight of the wheel bearing device (mainly, the flanged shaft member).

However, in the existing wheel bearing device, after a forging is manufactured by cold forging, a plurality of flange portions formed of raised pieces need to be formed at one shaft end portion of the forging, so manufacturing costs increase.

SUMMARY OF THE INVENTION

The invention provides a wheel bearing device and a manufacturing method therefor.

An aspect of the invention provides a wheel bearing device. The wheel bearing device includes a flanged shaft member that includes a shaft portion to which a rolling bearing is assembled, a fitting shaft portion that is formed on one end side of the shaft portion and that is fitted to a center hole of a wheel, and a plurality of flange portions that extend radially outward on an outer peripheral surface located between the shaft portion and the fitting shaft portion and each of which has a through bolt hole in which a hub bolt for fastening the wheel is arranged, wherein each flange portion is formed by side extrusion when a forged recess is formed by cold forging at a center of an end surface of the fitting shaft portion, and an edge portion of a cross-sectional shape taken perpendicularly to a longitudinal direction of each flange portion is formed in an R-chamfered shape.

With the above configuration, the plurality of flange portions are formed radially on the outer peripheral surface located between the shaft portion and the fitting shaft portion by cold side extrusion. Thus, it is possible to reduce manufacturing costs while reducing the weight.

In addition, the edge portion of the cross-sectional shape taken perpendicularly to the longitudinal direction of each flange portion is formed in an R-chamfered shape. Thus, when the flange portions are formed by cold side extrusion, the flange portions may be formed using a molding die having flange molding portions in each of which an edge portion is formed with a rounded surface in correspondence with the cross-sectional shape of each flange portion.

Therefore, it is possible to prevent concentration of material flow pressure on the edge portion of the cross-sectional shape of each flange molding portion of the molding die.

As a result, it is possible to improve the die life by preventing early fracture due to concentration of stress on the edge portion of the cross-sectional shape of each flange molding portion of the molding die and, by extension, it is possible to reduce manufacturing costs of the wheel bearing device.

Another aspect of the invention provides a manufacturing method for a wheel bearing device that includes a flanged shaft member that includes a shaft portion to which a rolling bearing is assembled, a fitting shaft portion that is formed on one end of the shaft portion, that has a larger diameter than that of the shaft portion and that is fitted to a center hole of a wheel, and a plurality of flange portions that are located between the shaft portion and the fitting shaft portion, that extend radially outward and each of which has a through bolt hole in which a hub bolt for fastening the wheel is arranged. The manufacturing method includes: forming the flange portions by side extrusion on an outer peripheral surface between the shaft portion and the fitting shaft portion while forming a forged recess at a center of an end surface of the fitting shaft portion by a forging die apparatus for cold forging, wherein the flange portions are formed using a molding die of the forging die apparatus, wherein the molding die of the forging die apparatus for cold forging has a cavity in which a cross-sectional shape taken perpendicularly to a longitudinal direction of a flange molding portion corresponding to each flange portion is formed so that an edge portion is formed with a rounded surface in correspondence with the cross-sectional shape of each flange portion, and the molding die is used to form the flange portions.

With the above configuration, it is possible to easily manufacture the wheel bearing device, and it is possible to reduce manufacturing costs of the wheel bearing device by improving the die life of the forging die apparatus.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 12 is a cross-sectional view that shows a flange molding portion of a pair of first and second molding dies for cold forging, according to the second embodiment;

FIG. 20 is a cross-sectional view of the flange portion, taken along the line XX-XX in FIG. 19;

DETAILED DESCRIPTION OF EMBODIMENTS

Embodiments of the invention will be described.

First Embodiment

First, a wheel bearing device according to a first embodiment of the invention will be described with reference to FIG. 1 to FIG. 3.

Figure 1:
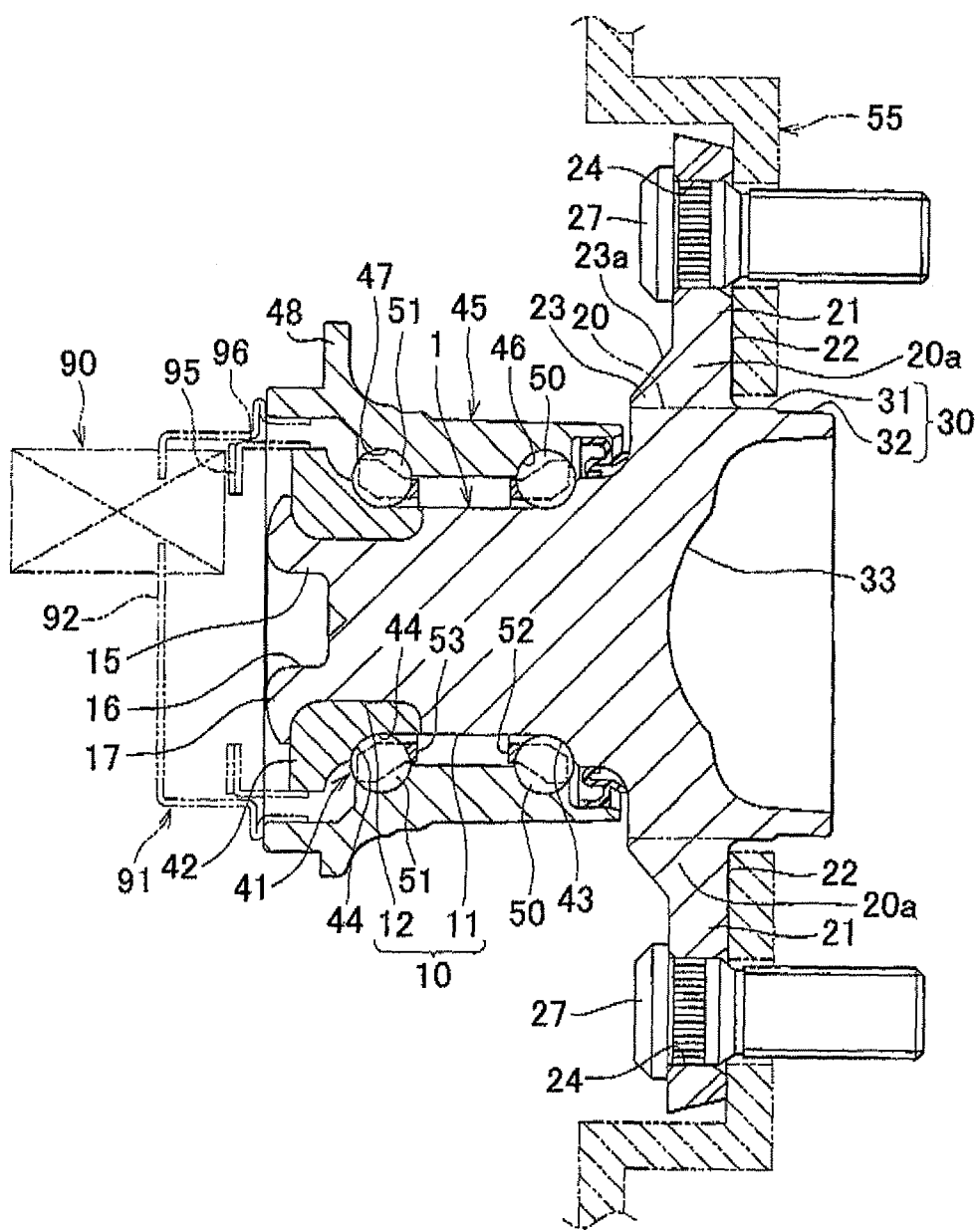
FIG. 1 is a longitudinal sectional view that shows a wheel bearing device according to a first embodiment of the invention.

As shown in FIG. 1, a wheel hub unit includes a unit of a flanged shaft member (hub wheel) 1 and a double row angular contact ball bearing 41. The wheel hub unit serves as the wheel bearing device. The double row angular contact ball bearing 41 serves as a rolling bearing.

The flanged shaft member 1 integrally includes a shaft portion 10, a fitting shaft portion 30, a flange proximal portion 20a and a plurality of flange portions 21. The double row angular contact ball bearing 41, which serves as the rolling bearing, is assembled onto the outer peripheral surface of the shaft portion 10. The fitting shaft portion 30 is formed on one end side of the shaft portion 10 and has a larger diameter than that of the shaft portion 10. The fitting shaft portion 30 is fitted to a center hole of a wheel (not shown). The flange proximal portion 20a is located between the shaft portion 10 and the fitting shaft portion 30. The plurality of flange portions 21 extend radially outward on the outer peripheral surface of the flange proximal portion 20a. Each of the plurality of flange portions 21 has a through bolt hole 24 at a portion adjacent to the distal end. A hub bolt 27 for fastening the wheel is press-fitted and arranged in a corresponding one of the bolt holes 24.

In addition, the fitting shaft portion 30 has a brake rotor fitting portion 31 and a wheel fitting portion 32. The brake rotor fitting portion 31 is formed at a portion adjacent to the flange portions 21. The wheel fitting portion 32 is formed at a portion adjacent to the distal end. The wheel fitting portion 32 has a diameter that is slightly smaller than that of the brake rotor fitting portion 31.

In the first embodiment, the double row angular contact ball bearing 41 is configured as follows. An outer ring member 45 is arranged around the outer peripheral surface of the shaft portion 10 of the flanged shaft member 1 with an annular gap. A plurality of balls 50 and 51, which serve as rolling elements, are respectively held by retainers 52 and 53 and respectively installed between both raceway surfaces 46 and 47 and both raceway surfaces 43 and 44. Both raceway surfaces 46 and 47 are formed on the inner peripheral surface of the outer ring member 45, spaced apart from each other at a predetermined distance in the axial direction. Both raceway surfaces 43 and 44 are formed on the shaft portion 10.

In addition, in the first embodiment, the shaft portion 10 of the flanged shaft member 1 has a stepped shaft shape so that a portion adjacent to the flange portions 21 has a large diameter and a portion adjacent to the distal end has a small diameter, and one raceway surface 43 is formed on the outer peripheral surface of the large-diameter portion 11 of the shaft portion 10.

In addition, an inner ring member 42 is fitted onto the outer peripheral surface of the small-diameter portion 12 of the shaft portion 10, and the other raceway surface 44 is formed on the outer peripheral surface of the inner ring member 42.

Furthermore, an end shaft portion 15 having the same diameter as the small-diameter portion 12 is extended at the distal end portion of the shaft portion 10. A shaft end recess 16 is formed at the center of the end surface of the end shaft portion 15. The distal end portion of the end shaft portion 15 is swaged radially outward to form a crimp portion 17. Thus, the inner ring member 42 is fixed to the outer peripheral surface of the small-diameter portion 12.

In addition, a vehicle body-side flange 48 is integrally formed at the axially center portion of the outer peripheral surface of the outer ring member 45. The wheel hub unit is, for example, coupled at the vehicle body-side flange 48 by bolts to a vehicle body-side member, such as a knuckle supported by a suspension (not shown) of the vehicle and a fitting surface of a carrier.

Figure 2:
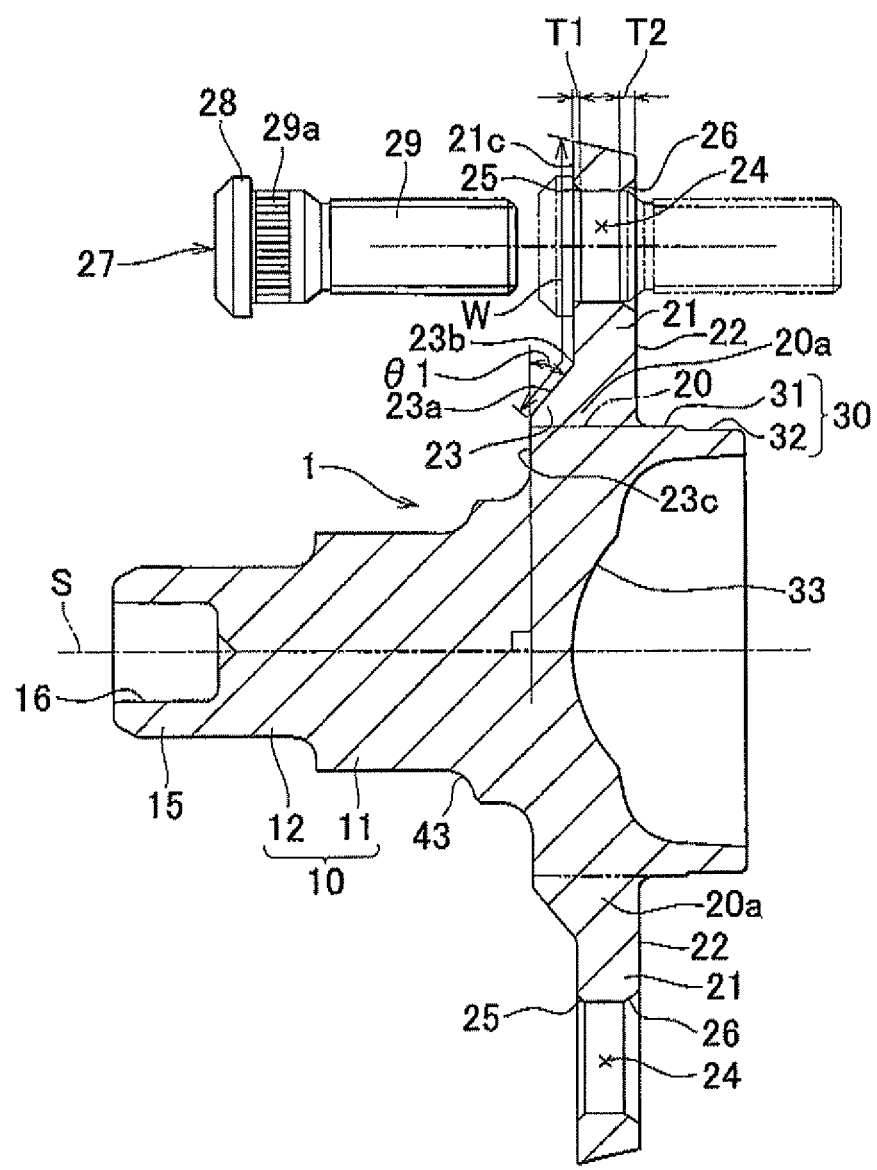
FIG. 2 is a longitudinal sectional view that shows a flanged shaft member according to the first embodiment.
Figure 3:
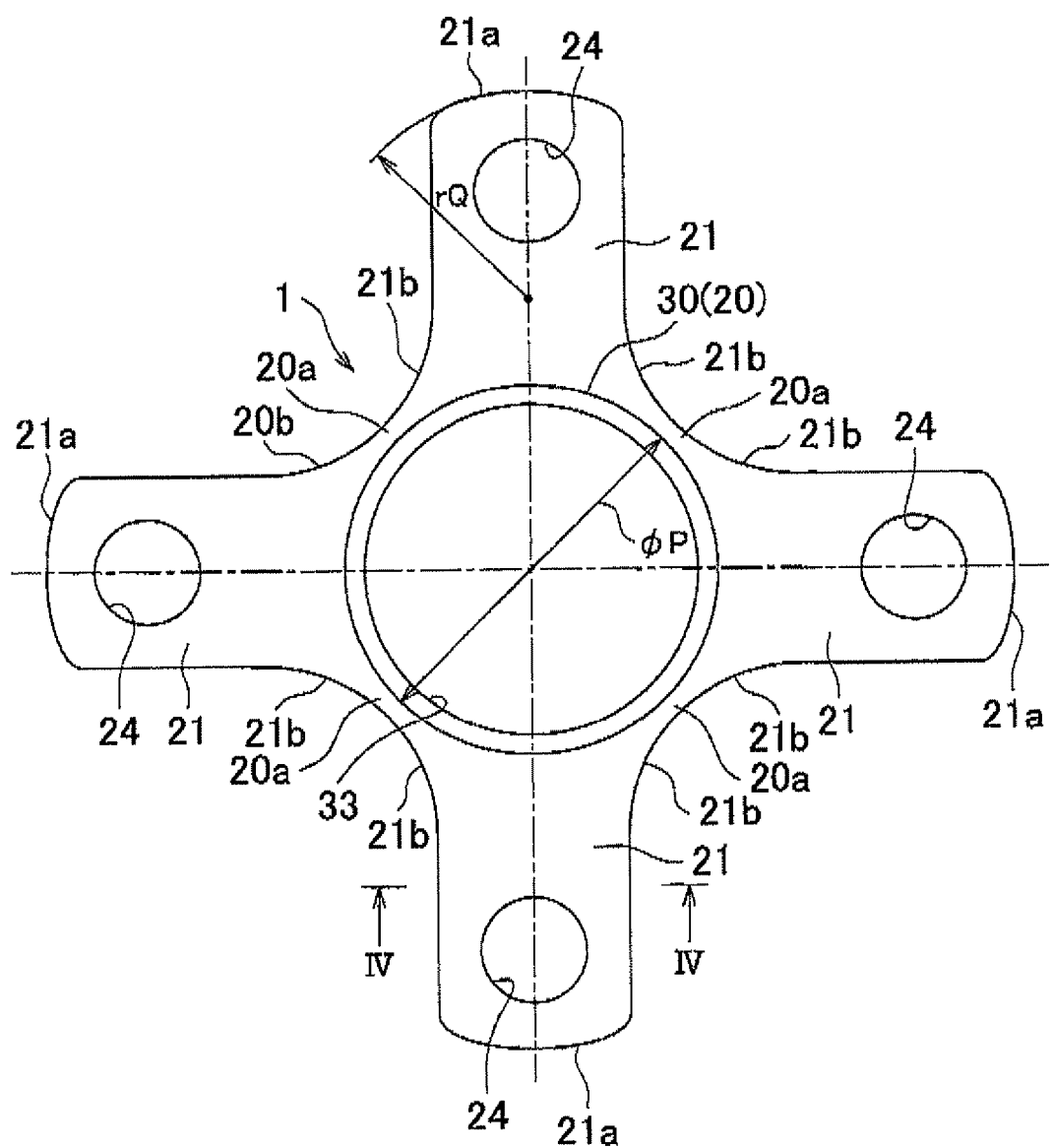
FIG. 3 is a plan view that shows the flanged shaft member from a fitting shaft portion side, according to the first embodiment.

As shown in FIG. 2 and FIG. 3, the plurality of flange portions 21 of the flanged shaft member 1 are formed by side extrusion when a forged recess 33 is formed at the center of the end surface of the fitting shaft portion 30 by cold forging. In addition, a thick portion 23 is formed at one side (a vehicle interior side when a rotor support surface 22 of each flange portion 21 is directed to a vehicle exterior side) of the base portion (proximal portion) and a portion near the base portion (hereinafter, simply referred to as the portion near the base portion) of each flange portion 21. Each thick portion 23 projects toward the vehicle interior side.

Furthermore, each thick portion 23 is formed in a slope shape so that thickness of the thick portion 23 gradually reduces from a portion adjacent to the base portion (proximal portion) of the flange portion 21 toward a portion adjacent to the bolt hole 24 of the flange portion 21. The inclination angle (angle with respect to an annular flat surface 23c perpendicular to a rotation center axis S of the flanged shaft member 1) θ1 of an inclined surface 23a of the thick portion 23 is desirably set to satisfy the relationship $20° \leq \theta1 \leq 45°$ when taking into consideration flow of material during cold forging and release of a forging from dies after molding.

In addition, as shown in FIG. 3, in order for stress not to concentrate on the base portions of both widthwise side surfaces of each flange portion 21, the base portions of both widthwise side surfaces of each flange portion 21 each form a curved surface (including circular arc surface) 21b that gradually increases in width toward the outer peripheral surface of the flange proximal portion 20a, and the curved surfaces 21b of the adjacent flange portions 21 are continuous with the outer peripheral surface of the flange proximal portion 20a.

In addition, as shown in FIG. 3, the distal end surface of each flange portion 21 is formed with a circular arc surface 21a having a radius that is about half the diameter of the brake rotor fitting portion 31 of the fitting shaft portion 30. That is, where the diameter of the brake rotor fitting portion 31 of the fitting shaft portion 30 is φP, and the radius of the circular arc surface 21a formed at the distal end of the flange portion 21 is rQ, the distal end surface of each flange portion 21 is formed to satisfy the relationship $\phi P/2 \approx rQ$.

Figure 4:
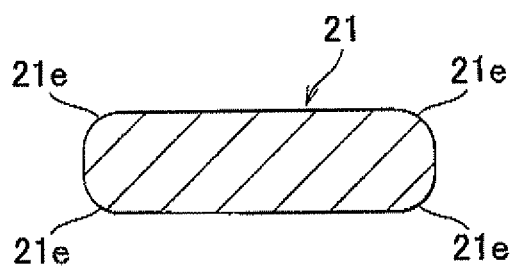
FIG. 4 is a cross-sectional view of a flange portion, taken along the line IV-IV in FIG. 3.

In the first embodiment, each flange portion 21 is formed by cold side extrusion, while, at the same time, each edge portion 21e of the cross-sectional shape taken perpendicularly to the longitudinal direction of each flange portion 21 is formed in an R-chamfered shape, as shown in FIG. 4.

For example, when the thickness of each flange portion 21 is about 6 mm to 8 mm, each edge portion 21e is desirably formed with a rounded surface having a radius of 3 mm.

In the thus configured wheel bearing device according to the first embodiment of the invention, the plurality of flange portions 21 are formed radially on the outer peripheral surface of the flange proximal portion 20a, which is located between the shaft portion 10 and the fitting shaft portion 30, by cold side extrusion. Thus, it is possible to reduce manufacturing costs while reducing the weight.

In addition, as shown in FIG. 4, each edge portion 21e of the cross-sectional shape taken perpendicularly to the longitudinal direction of each flange portion 21 is formed in an R-chamfered shape. Thus, when the flange portions 21 are formed by cold side extrusion, the flange portions 21 may be formed using molding dies (first and second molding dies 71 and 72, which will be described later) having flange molding portions (which will be described later) 78 in each of which edge portions 80b and 81b are formed with a rounded surface in correspondence with the cross-sectional shape of each flange portion 21 (see FIG. 7).

Therefore, it is possible to prevent concentration of material flow pressure in cold forging on the edge portions 80b and 81b of the cross-sectional shape of each flange molding portion 78.

As a result, it is possible to improve the die life by preventing early abrasion of the edge portions 80b and 81h of the cross-sectional shape of each flange molding portion 78, and, by extension, it is possible to reduce manufacturing costs of the wheel bearing device.

Next, a manufacturing method for the wheel bearing device according to the first embodiment will be described with reference to FIG. 5 to FIG. 9.

Figure 5:
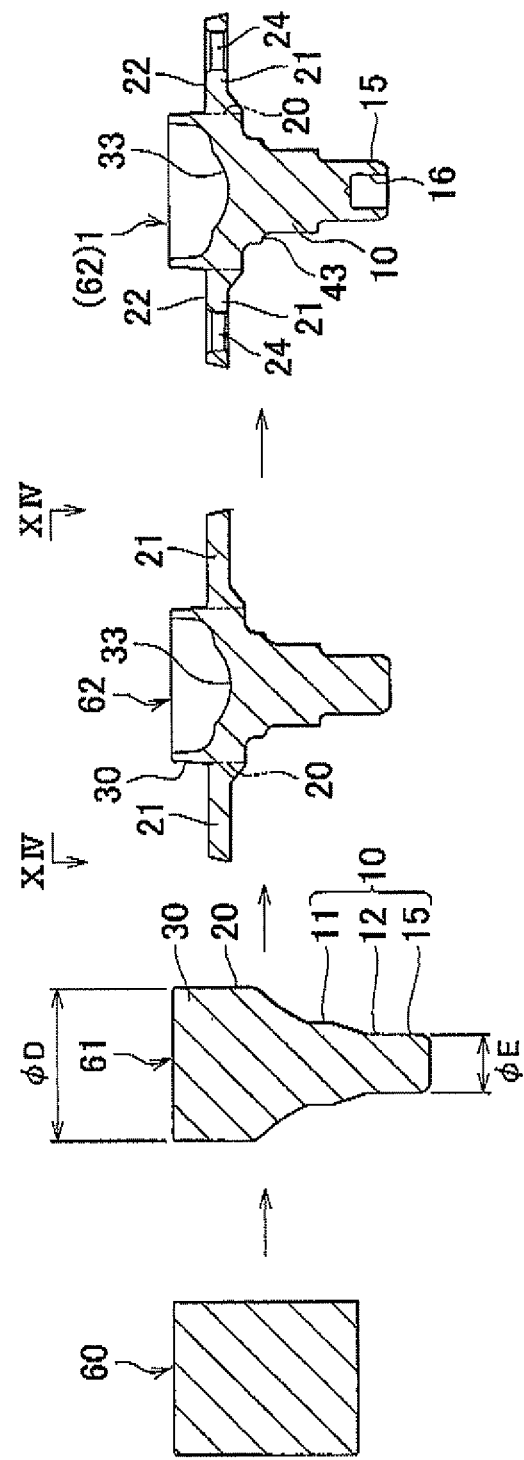
FIG. 5 is an explanatory diagram for illustrating the manufacturing process of the flanged shaft member, according to the first embodiment.

As shown in FIG. 5, a round bar material of structural carbon steel (for example, carbon steel, such as S45C, S50C and S55C, having a carbon content of about 0.5% is desirable) is cut into a desired length to form a shaft-like material 60.

Subsequently, the shaft-like material 60 is heated to, for example, about 800° C., and then cooled and annealed.

After that, a forging die apparatus (not shown) for cold forward extrusion is used to apply forward extrusion to the shaft-like material 60. By so doing, the shaft portion (including the large-diameter portion 11, the small-diameter portion 12 and the end shaft portion (in this state, no shaft end recess 16 is formed) 15) 10, the intermediate shaft portion (that forms the flange proximal portion 20a and part of the fitting shaft portion 30) 20 and the fitting shaft portion (in this state, neither the forged recess 33 nor the brake rotor fitting portion 31 is formed) 30 are formed to thereby manufacture a primary molding 61 by cold forward extrusion.

Thereafter, as shown in FIG. 5 to FIG. 9, a forging die apparatus 70 for cold side extrusion is used to form the forged recess 33 on the center of the end surface of the fitting shaft portion 30 while forming the plurality of flange portions 21 radially on the outer peripheral surface of the intermediate shaft portion 20 located between the shaft portion 10 and fitting shaft portion 30 of the primary molding 61, thus manufacturing a secondary molding 62.

As shown in FIG. 6 to FIG. 9, in the forging die apparatus 70 for cold side extrusion, a cavity 75 is formed between the pair of first and second molding dies 71 and 72. The primary molding 61 is set in the cavity 75. The cavity 75 has a plurality of radial flange molding portions 78 in order to form the plurality of flange portions 21 by side extrusion.

The flange molding portions 78 each are formed of molding grooves 76 and 77 formed respectively in the pair of first and second molding dies 71 and 72.

Figure 6:
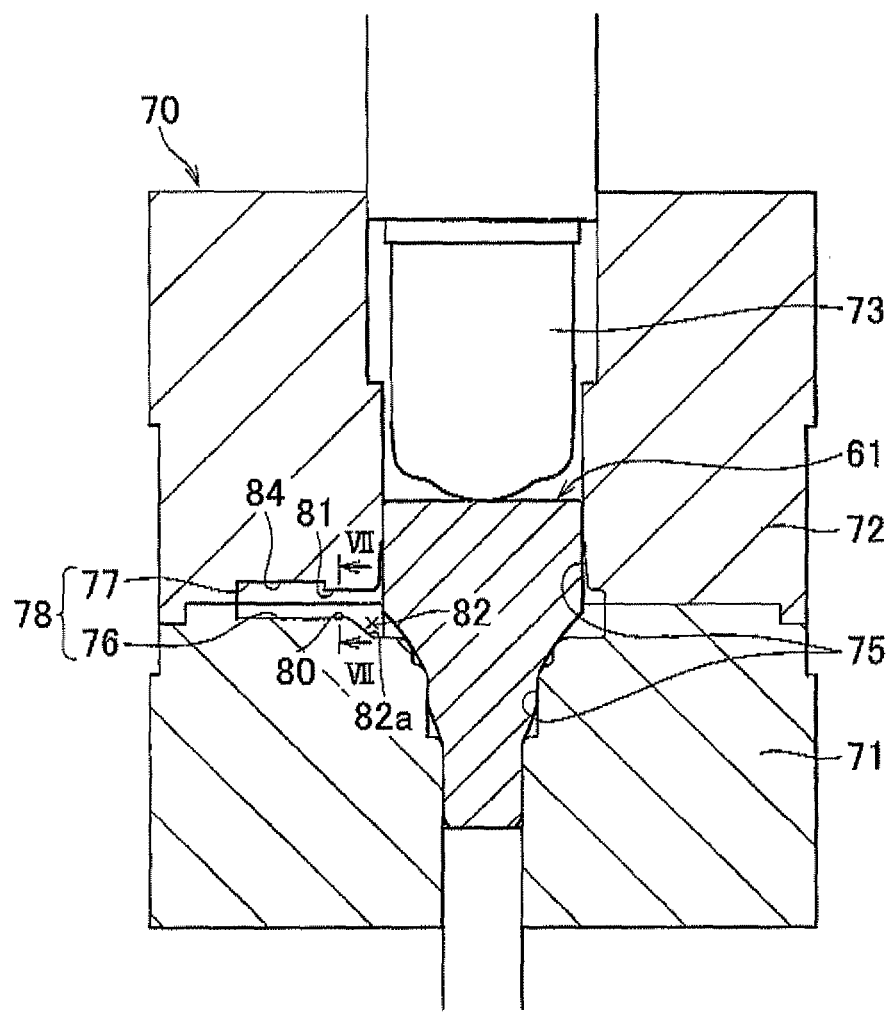
FIG. 6 is a longitudinal sectional view that shows a state where a primary molding is set in a cavity of a pair of first and second molding dies for cold forging and the first and second molding dies are closed, according to the first embodiment.
Figure 7:
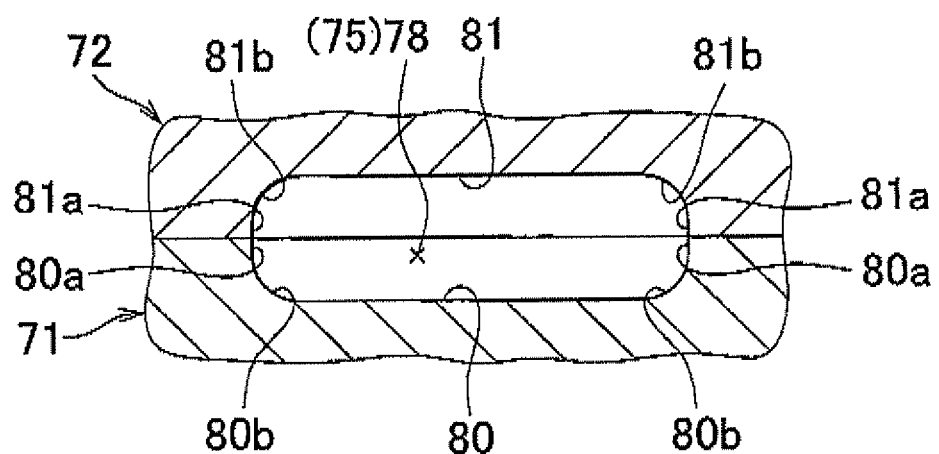
FIG. 7 is a cross-sectional view of a flange molding portion, taken along the line VII-VII in FIG. 6.

That is, as shown in FIG. 6 and FIG. 7, the gap between the facing guide surfaces 80 and 81 of both upper and lower wall surface of the molding grooves 76 and 77 of both the first and second molding dies 71 and 72 is set to a size equivalent to the thickness of each flange portion 21, and the gap between the facing guide surfaces 80a and 81a of both left and right side wall surfaces is set to a size equivalent to the width of each flange portion 21. Then, the cross-sectional shape taken perpendicularly to the longitudinal direction of each flange molding portion 78 is the same shape as the cross-sectional shape of each flange portion 21, and the edge portions 80b and 81b are formed with a rounded surface (for example, a rounded surface having a radius of 3 mm).

Figure 9:
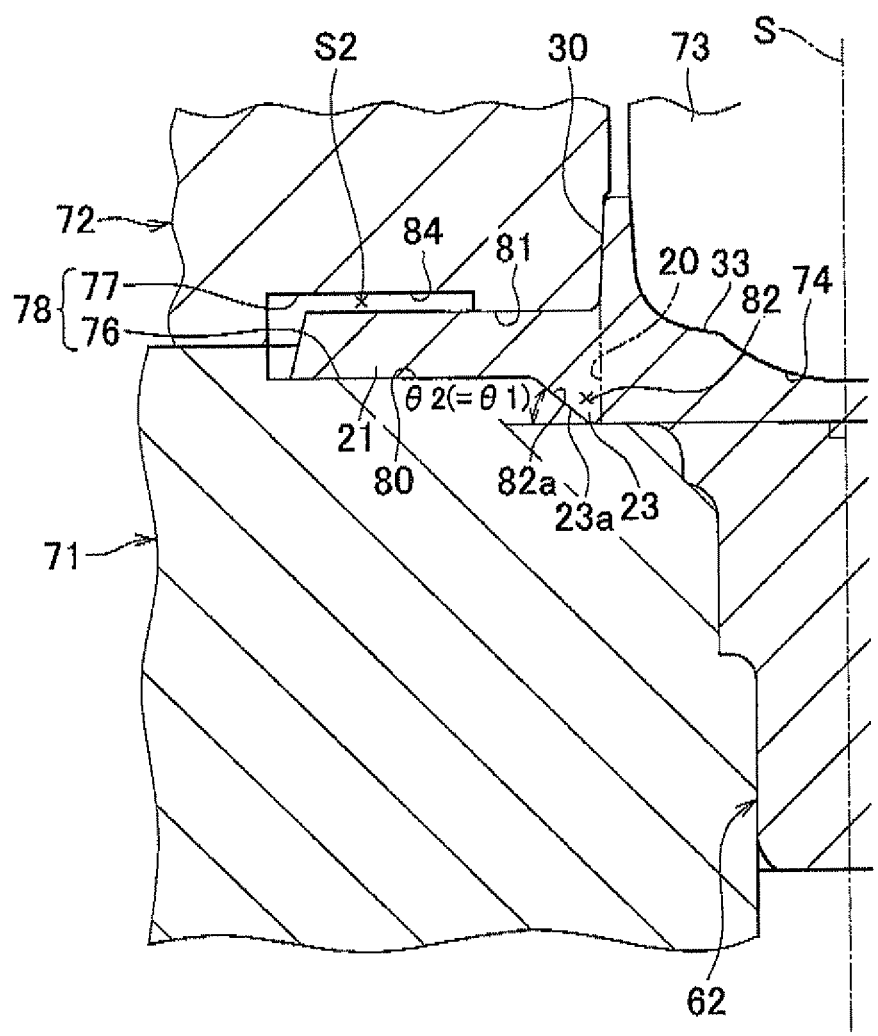
FIG. 9 is an enlarged longitudinal sectional view that shows the flange molding portion of the cavity of the pair of first and second molding dies, according to the first embodiment.

In addition, in the first embodiment, as shown in FIG. 9, a relief portion 84 is formed at the distal end side of the guide surface 81 other than a portion near the material inflow side in the molding groove 77 of the second molding die 72. The second molding die 72 is located opposite the thick portion 23 near the base portion of each flange portion 21. The relief portion 84 keeps a gap S2 from the flange portion 21.

On the other hand, in the first embodiment, the guide surface 80 of the molding groove 76 of the first molding die 71 that forms a portion adjacent to the thick portion 23 near the base portion of each flange portion 21 is formed with a die structure with no relief portion.

In addition, in the first embodiment, a thick portion molding groove 82 is formed at the material inflow side of the molding groove 76 of the first molding die 71.

The thick portion molding groove 82 is used to form the thick portion 23 of each flange portion 21. The bottom surface of the thick portion molding groove 82 is formed to have an inclined surface 82a so that the depth gradually reduces from a portion adjacent to the base portion of the flange portion 21 toward a portion adjacent to the bolt hole 24, and is continuous with the guide surface 80 (see FIG. 6).

In addition, an inclination angle θ2 of the inclined surface 82a of the bottom surface of the thick portion molding groove 82 is set as in the case of the inclination angle θ1 of the inclined surface 23a of the thick portion 23 of each flange portion 21, that is, so as to satisfy the relationship "20°≦θ2≦45°".

Figure 8:
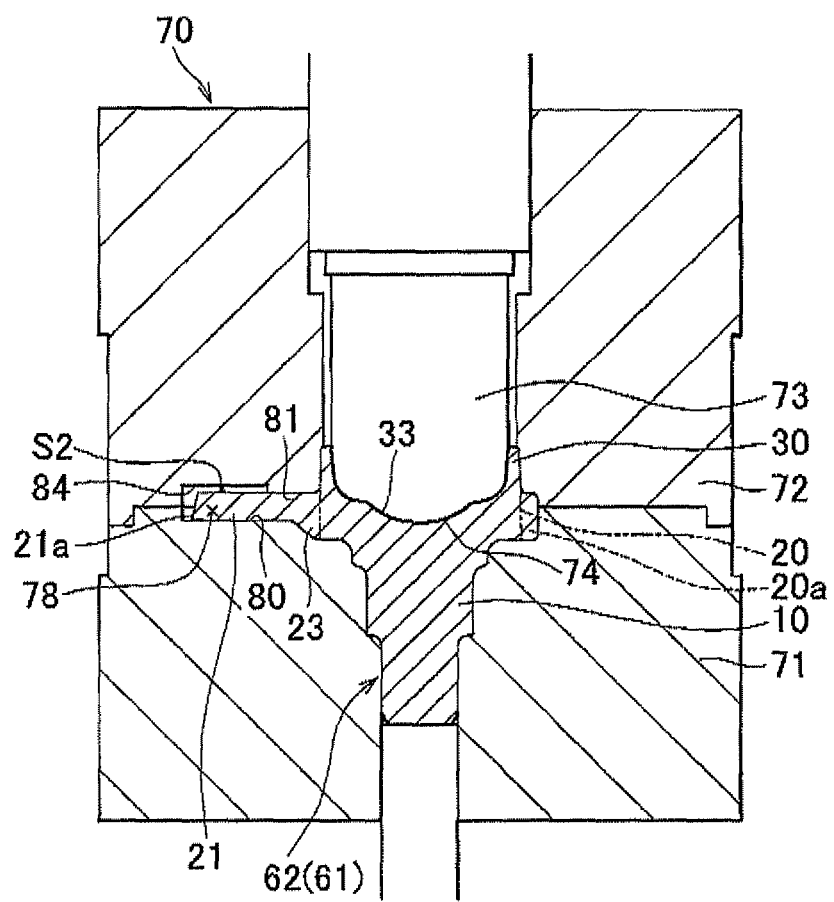
FIG. 8 is a longitudinal sectional view that shows a state where a plurality of flange portions are formed by side extrusion while forming a forged recess on an end surface of the fitting shaft portion of the primary molding using a punch, according to the first embodiment.

In addition, the radial length of each flange molding portion 78 formed of the molding grooves 76 and 77 is set so that the circular arc surface 21a at the distal end of each flange portion 21 does not contact a corresponding one of the flange molding portions 78 (see FIG. 8 and FIG. 9).

Then, first, as shown in FIG. 6, between the first molding die (drag) 71 and second molding die (cope) 72 of the forging die apparatus 70, the primary molding 61 is set in the first molding die 71, and the second molding die 72 is closed to the first molding die 71.

After that, as shown in FIG. 6 and FIG. 8, a punch 73 is lowered toward the center of the end surface of the fitting shaft portion 30 of the primary molding 61, and forms the forged recess 33 at the center of the end surface of the fitting shaft portion 30 by a distal end portion 74 of the punch 73 while applying side extrusion to the outer peripheral surface of the intermediate shaft portion 20 located between the shaft portion 10 and fitting shaft portion 30 of the primary molding 61 toward the flange molding portions 78 of the cavity 75 formed in the pair of first and second molding dies 71 and 72. By so doing, the plurality of flange portions 21 are formed. At the same time, the edge portions 21e of the cross-sectional shape taken perpendicularly to the longitudinal direction of each flange portion 21 are formed in an R-chamfered shape.

Furthermore, by means of the above described side extrusion, the thick portion 23 is formed at one side near the base portion of each flange portion 21. By so doing, the secondary molding 62 is manufactured by side extrusion. Note that the intermediate shaft portion 20 forms the flange proximal portion 20a and part of the fitting shaft portion 30 through deformation in cold forging.

Subsequently, portions of the secondary molding 62, which require turning, are subjected to turning. Then, through turning, for example, the bolt hole 24 is formed in each flange portion 21, and both chamfered portions 25 and 26 are respectively formed at the opening portions at both ends of each bolt hole 24. Furthermore, the shaft end recess 16 is formed in the end shaft portion 15 of the shaft portion 10.

After that, the secondary molding 62 is quenched, and then the raceway surface 43 of the large-diameter portion 11 of the shaft portion 10, the rotor support surface 22 of each flange portion 21, and the like, are formed by turning or polishing. By so doing, the flanged shaft member 1, which is a finished product, is manufactured.

In addition, as shown in FIG. 2, where the depth of the first chamfered portion 25 located at the thick portion 23 side of each flange portion 21 is T1, and the depth of the second chamfered portion 26 located at the other side is T2, both first and second chamfered portions 25 and 26 formed at the opening portions at both ends of the bolt hole 24 of each flange portion 21 are desirably set to satisfy the relationship "T1<T2".

That is, in a state where a serration shaft portion (formed at the base portion of a shaft portion 29) 29a of the hub bolt 27 has been press-fitted into the bolt hole 24 of a corresponding one of the flange portions 21, the flange portion 21 has a characteristic such that the tip of the flange portion 21 slightly warps and deforms to have warpage toward a side at which the depth of the chamfered portion is large.

Therefore, even if "warpage" occurs toward the thick portion 23 of a corresponding one of the flange portions 21 by side extrusion, the "warpage" toward the thick portion 23 side of the flange portion 21 is reduced in such a manner that the hub bolt 27 is press-fitted into the bolt hole 24 of the flange portion 21.

In addition, it is desirable to ensure plane accuracy (for example, squareness is 0.1 or below) required of each flange portion 21 and to improve the strength by means of the following manner. As shown in FIG. 2, the bolt bearing surface 21c is formed at one side surface of each flange portion 21, at which the thick portion 23 is formed (surface opposite to the rotor support surface 22), and contacts the lower surface of a head 27 of the hub bolt 27, and then the bolt bearing surface 21c is finished by coining.

Furthermore, it is desirable to further improve the strength of each flange portion 21 by finishing a region that extends over the area of the bolt bearing surface 21c to a boundary R surface 23b of the inclined surface 23a of the thick portion 23 of each flange portion 21 or to the boundary R surface 23b and the inclined surface 23a (coining region W shown in FIG. 2) by means of coining.

In addition, it is desirable to finish the surface through coining so that the surface hardness is HRC25 or above, and the surface roughness Ra is 6.3 or below.

Lastly, as shown in FIG. 1, the plurality of balls 50 and 51, the retainers 52 and 53 and the outer ring member 45 are assembled onto the outer peripheral surface of the shaft portion 10 of the flanged shaft member 1.

Then, after the inner ring member 42 is fitted onto the outer peripheral surface of the small-diameter portion 12 of the shaft portion 10, the distal end portion of the end shaft portion 15 is swaged radially outward to form the crimp portion 17. By so doing, the inner ring member 42 is fixed to the outer peripheral surface of the small-diameter portion 12.

In addition, before or after the angular contact ball bearing 41 is assembled to the outer peripheral surface of the shaft portion 10 of the flanged shaft member 1, the shaft portion 29 of each hub bolt 27 is inserted from the first chamfered portion 25 side of the bolt hole 24 of a corresponding one of the flange portions 21, and the serration shaft portion 29a of the shaft portion 29 is press-fitted into the bolt hole 24. By so doing, each hub bolt 27 is fixed to a corresponding one of the flange portions 21.

In this way, the wheel bearing device is manufactured.

Note that as shown in FIG. 1, a pulser ring 96 is, where necessary, fixedly press-fitted to the outer peripheral surface of the inner ring member 42. The pulser ring 96 has a detected portion 95 in the circumferential direction. The detected portion 95 faces a speed sensor 90. In this case, a closed-end cylindrical cover member 91 is fixedly press-fitted to the inner peripheral surface at the end portion of the outer ring member 45, and the speed sensor 90 is attached to a cover plate portion 92 of the cover member 91 so that the detecting portion of the speed sensor 90 is placed to face the detected portion 95 of the pulser ring 96.

Thus, with the thus configured manufacturing method for the wheel bearing device according to the first embodiment of the invention, the pair of first and second molding dies 71 and 72 are used. In the pair of first and second molding dies 71 and 72, the cross-sectional shape taken perpendicularly to the longitudinal direction of the flange molding portion 78 has the same shape as the cross-sectional shape of each flange portion 21, and the edge portions 80b and 81b are formed with a rounded surface (for example, a rounded surface having a radius of 3 mm). Thus, it is possible to easily form the secondary molding 62 of the flanged shaft member 1.

In addition, the edge portions 80b and 81b of the cross-sectional shape of the flange molding portion 78 are formed with a rounded surface, so it is possible to prevent concentration of material flow pressure in cold forging.

As a result, it is possible to improve the die life by preventing early abrasion of the edge portions 80b and 81b of the cross-sectional shape of each flange molding portion 78, and, by extension, it is possible to reduce manufacturing costs of the wheel bearing device.

In addition, the relief portion 84 that keeps the gap S2 between each flange portion 21 and a corresponding one of the molding grooves 77 of the second molding die 72 is formed at a portion corresponding to a side opposite a side of the thick portion 23 near the base portion of the flange portion 21. Therefore, it is possible to reduce contact friction force between material at the time of flow of material in cold forging and each molding groove 77 of the second molding die 72 by the amount corresponding to the relief portion 84 when the flange portions 21 are formed while the forged recess 33 is formed at the center of the end surface of the fitting shaft portion 30 by the distal end portion 74 of the punch 73. By so doing, friction resistance between the molding dies and material is reduced to make it possible to prevent an increase in load.

In addition, in the first embodiment, as shown in FIG. 6, FIG. 8 and FIG. 9, the first molding die 71 has a die structure such that no relief portion is formed in each molding groove 76. By so doing, the first molding die 71 is able to appropriately suppress occurrence of "warpage" toward the thick portion 23 side of each flange portion 21 because of the flow characteristics of the material along the fiber flow lines in cold forging.

That is, cold forging has a characteristic such that warpage directed toward the thick portion 23 tends to occur in each flange portion 21 because of the flow characteristics of the material along the fiber flow lines. Because of warpage toward the thick portion 23 side of each flange portion 21, for example, it may be difficult to finish the entire surface of the rotor support surface 22 of each flange portion 21 into a flat surface. When the entire surface of the rotor support surface 22 of each flange portion 21 is not finished into a flat surface, it is conceivable that, for example, installation of the brake rotor 55 becomes unstable. However, by suppressing occurrence of "warpage" toward the thick portion 23 side of each flange portion 21 as described above, it is easy to finish the entire surface of the rotor support surface 22 of each flange portion 21 into a flat surface. Therefore, it is possible to install the brake rotor 55 stably.

Second Embodiment

Next, a wheel bearing device according to a second embodiment of the invention will be described with reference to FIG. 10 and FIG. 11.

Figure 10:
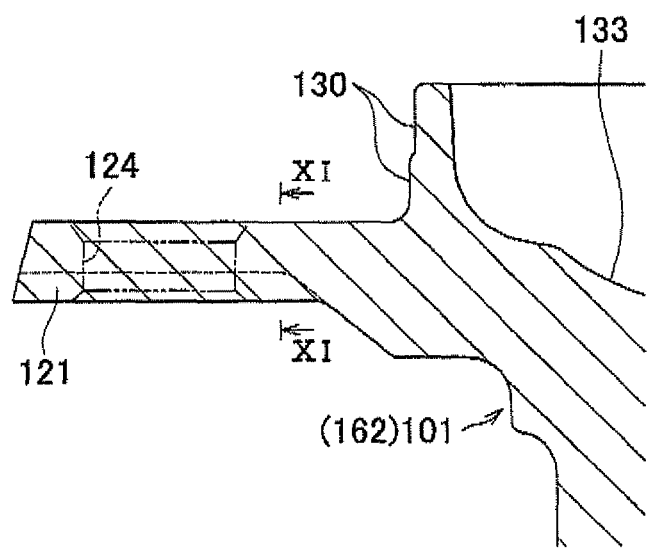
FIG. 10 is a longitudinal sectional view that shows a flange portion of a flanged shaft member of a wheel bearing device, according to a second embodiment of the invention.

As shown in FIG. 10, in the second embodiment as well, a plurality of flange portions 121 of a flanged shaft member 101 are formed by side extrusion when a forged recess 133 is formed at the center of the end surface of a fitting shaft portion 130 by cold forging.

Figure 11:
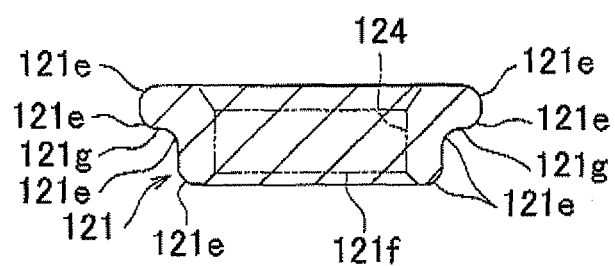
FIG. 11 is a cross-sectional view of the flange portion, taken along the line XI-XI in FIG. 10.

As shown in FIG. 11, in the second embodiment, each flange portion 121 is formed so that both side portions 121g are thinner than a widthwise center portion 121f in the cross-sectional shape taken perpendicularly to the longitudinal direction. In addition, edge portions 121e of the cross-sectional shape of each flange portion 121 are formed in an R-chamfered shape.

The other configuration of the second embodiment is similar to that of the first embodiment, so the description thereof may be omitted where appropriate. This also applies to the embodiments described later.

Thus, in the thus configured wheel bearing device according to the second embodiment of the invention, it is possible to reduce the weight by the amount by which both side portions 121g are formed to be thinner than the widthwise center portion 121f in cross-sectional shape taken perpendicularly to the longitudinal direction of each flange portion 121.

In other words, the widthwise center portion 121f of each flange portion 121 is formed to have a desired thickness, and a through bolt hole 124 is formed in the widthwise center portion 121f. By so doing, it is possible to ensure the length for press-fitting the hub bolt, while favorably reducing the weight.

Next, a manufacturing method for the wheel bearing device according to the second embodiment of the invention will be described with reference to FIG. 12.

As shown in FIG. 12, in the second embodiment, each flange molding portion 178 is formed of molding grooves 176 and 177 of a pair of first and second molding dies 171 and 172 of a forging die apparatus 170 for cold side extrusion. The cross-sectional shape of each flange molding portion 178 corresponds to the cross-sectional shape of a corresponding one of the above described flange portions 121, and both side portions 176b are formed to be smaller than a widthwise center portion 176a.

Furthermore, edge portions 180b and 181b of the cross-sectional shape of each flange molding portion 178 is formed with a rounded surface.

The other configuration of the manufacturing method for the wheel bearing device according to the second embodiment is similar to that of the manufacturing method for the wheel bearing device according to the first embodiment, so the description thereof is omitted.

Thus, with the thus configured manufacturing method for the wheel bearing device according to the second embodiment of the invention, the pair of first and second molding dies 171 and 172 are used. In the pair of first and second molding dies 171 and 172, the cross-sectional shape taken perpendicularly to the longitudinal direction of the flange molding portion 178 has the same shape as the cross-sectional shape of each flange portion 121, and the edge portions 180b and 181b are formed with a rounded surface (for example, a rounded surface having a radius of 3 mm). Thus, it is possible to easily form a secondary molding 162 of the flanged shaft member 101.

In addition, the edge portions 180*b* and 181*b* of the cross-sectional shape of the flange molding portion 178 are formed with a rounded surface, so it is possible to prevent concentration of material flow pressure in cold forging.

As a result, it is possible to improve the die life by preventing early abrasion of the edge portions 180*b* and 181*b* of the cross-sectional shape of the flange molding portion 178 and, by extension, it is possible to reduce manufacturing costs of the wheel bearing device.

Third Embodiment

Next, a wheel bearing device according to a third embodiment of the invention will be described with reference to FIG. 13 and FIG. 14.

Figure 13:
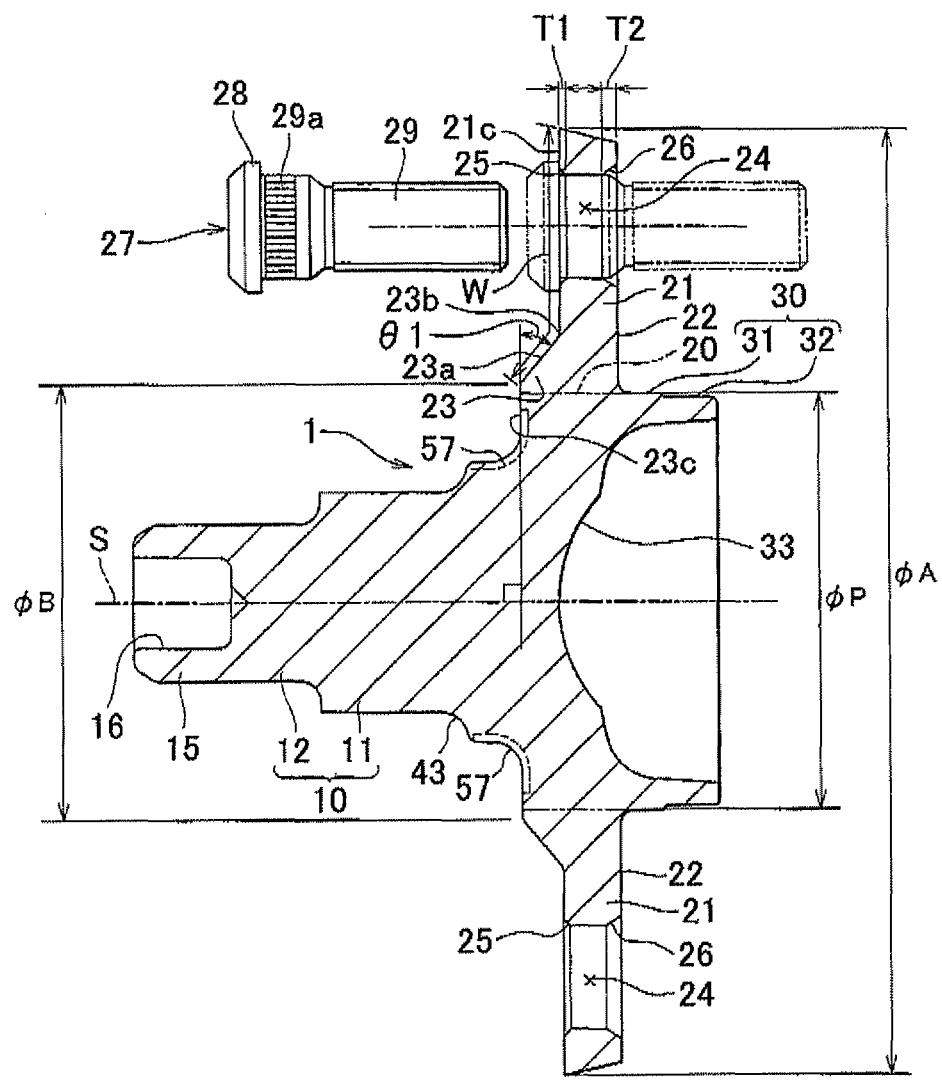
FIG. 13 is a longitudinal sectional view that shows a flanged shaft member of a wheel bearing device, according to a third embodiment of the invention.

As shown in FIG. 13, a seal sliding portion 57 is molded by cold forging with predetermined accuracy. In addition, the seal sliding portion 57 is formed of a bonderlube-treated film or a molybdenum disulfide film so that the coefficient of friction of the surface is low.

In addition, the characteristic of the area of the flange portions 21 and the flange proximal portion 20*a* in the third embodiment as viewed in the axial direction will be described. The shaded portion in FIG. 14 indicates a region in which the first molding die 71 contacts the second molding die 72 within a region of an outside diameter circle to which the flange portions 21 are extended in the secondary molding of cold forging. In other words, the shaded portion is a portion, by which the flange portions 21 are lightened.

Here, where the outside diameter of each flange portion 21 is φA, the outside diameter of the flange proximal portion 20*a* at the base of each flange portion 21 is φB, the width of each flange portion 21 in the circumferential direction is C, the number of flange portions 21 is N, the area of the flange portions 21 and flange proximal portion 20*a* as viewed in the axial direction (area of flange projected portion) is Sf and the area of the outside diameter circle of the flange portions 21 is Sa, the following equations hold.

$$Sf = N \times C \times (1/2) \times (\phi A - \phi B) + (\phi B/2) \times (\phi B/2) \times \pi$$

$$Sa = (\phi A/2) \times (\phi A/2) \times \pi$$

In the first embodiment, Sf/Sa of the secondary molding 62 is set to fall within the range of 0.53 to 0.56.

The Sf/Sa indicates the ratio of the area in which the first molding die 71 is not in contact with the second molding die 72 within the region of the outside diameter circle, to which the flange portions 21 are extended, with respect to the area of the outside diameter circle.

As the Sf/Sa increases, the ratio of the flange projected portion increases. Thus, the flow area of steel material increases, and flow characteristics of steel material by extrusion get better, so moldability improves. On the other hand, as the Sf/Sa increases, the area in which the first molding die 71 contacts the second molding die 72 decreases, and it is necessary to withstand die pressure with a small area, so load on the dies increases.

In addition, as the Sf/Sa decreases, the proportion of the flange projected portion decreases. Thus, the flow area of steel material reduces, and flow characteristics of steel material by extrusion get worse, so moldability deteriorates. On the other hand, as the Sf/Sa decreases, the area in which the first molding die 71 contacts the second molding die 72 increases, so die pressure may be supported with a wide area. Thus, load on the dies reduces.

Note that, as the result of test on the configurations having different values of Sf/Sa, it is found that, when the Sf/Sa is larger than 0.6, the contact area of the dies is small, and it is necessary to withstand die pressure with a small area, so the dies more easily fracture. In addition, it is also found that, when the Sf/Sa is smaller than 0.5, the flow area of steel material reduces, and flow characteristics of steel material get worse, so moldability of the flange portions gets worse and, therefore, the flange portions are hard to be molded into an expected shape. Thus, it is desirable that the Sf/Sa is larger than or equal to 0.5 and smaller than or equal to 0.6.

The other configuration of the third embodiment is similar to that of the first embodiment and that of the second embodiment, so the description thereof is omitted.

In the thus configured wheel bearing device according to the third embodiment of the invention, the seal sliding portion 57 is molded by cold forging with predetermined accuracy, so turning may be omitted. In addition, the seal sliding portion 57 is formed of a bonderlube-treated film or a molybdenum disulfide film so that the coefficient of friction of the surface is low, so polishing may be omitted.

In addition, in the third embodiment, the ratio Sf/Sa of the area Sf of the flange projected portion to the area Sa of the outside diameter circle of the flange portions 21 is higher than or equal to 0.53 and lower than or equal to 0.56. Therefore, in extrusion of the flange portions 21 in secondary molding of cold forging, excessive load does not act on the dies and moldability of the flange portions 21 is favorable, so it is possible to achieve both the die life and the moldability.

Next, a manufacturing method for the wheel bearing device according to the third embodiment will be described with reference to FIG. 5, FIG. 6, FIG. 8, FIG. 9 and FIG. 14.

The characteristic point of the manufacturing method for the wheel bearing device according to the third embodiment will be described.

As shown in FIG. 5, a round bar material of structural carbon steel (for example, carbon steel, such as S45C, S50C and S55C, having a carbon content of about 0.5% is desirable) is cut into a desired length to form a shaft-like material 60. Subsequently, the shaft-like material 60 is heated to, for example, about 800° C., and then cooled and annealed.

Subsequently, in order to improve releaseability after molding, the shaft-like material 60 is bonderized to form a phosphate film on the surface of the shaft-like material 60.

After that, bonderlube treatment may be performed in order to improve lubrication of the dies during forging process or molybdenum disulfide may be applied to the shaft-like material 60 and then dried in order to improve anti-seizure performance where necessary.

After that, a forging die apparatus (not shown) for cold forward extrusion is used to apply forward extrusion to the shaft-like material 60. By so doing, the shaft portion 10 (including the large-diameter portion 11, the small-diameter portion 12 and the end shaft portion 15 (in this state, no shaft end recess 16 is formed)), the intermediate shaft portion 20 and the fitting shaft portion 30 (in this state, neither the forged recess 33 nor the brake rotor fitting portion 31 is formed) are formed to thereby manufacture a primary molding 61 by cold forward extrusion.

Here, the shaft-like member 60 is subjected to bonderizing treatment and bonderlube treatment before cold forging, so lubrication of the dies during forging process is good. Thus, it is possible to extend the die life, and releaseability of the dies after molding is also good. In addition, the shaft-like material 60 is molded without heating in primary molding, so a film formed by bonderizing treatment and bonderlube treatment is formed on the surface of the primary molding 61.

Thereafter, as shown in FIG. 5, FIG. 6, FIG. 8 and FIG. 9, a forging die apparatus 70 for cold side extrusion is used to form the forged recess 33 at the center of the end surface of the fitting shaft portion 30 while forming the plurality of flange portions 21 radially on the outer peripheral surface of the intermediate shaft portion 20 located between the shaft portion 10 and fitting shaft portion 30 of the primary molding 61, thus manufacturing a secondary molding 62.

Here, the film formed by bonderizing treatment and bonderlube treatment is preserved on the surface of the primary molding 61, so lubrication of the dies during forging is good in secondary molding as well. Thus, it is possible to extend the die life, and releaseability of the dies after molding is good.

The other configuration of the manufacturing method for the wheel bearing device according to the third embodiment is similar to those of the manufacturing methods for the wheel bearing devices according to the first embodiment and the second embodiment, so the description thereof is omitted.

With the thus configured manufacturing method for the wheel bearing device according to the third embodiment of the invention, the flanged shaft member 1 is manufactured by cold forging applied to the shaft-like material 60 that has been subjected to bonderizing treatment and bonderlube treatment, so lubrication of the dies is good. Thus, the die life extends, and releaseability of the dies after molding is good. Then, the material is not heated during forging, so accuracy of finishing is good, and turning of the seal sliding portion 57 may be omitted. In addition, owing to the lubrication function of the film formed by bonderlube treatment, the flanged shaft member is finished to have a smooth surface and a low coefficient of friction by cold forging. Thus, polishing of the seal sliding portion 57 may be omitted.

Thus, according to the invention, it is possible to provide the manufacturing method for the wheel bearing device, which is able to reduce the weight and manufacturing costs.

Fourth Embodiment

Figure 15:
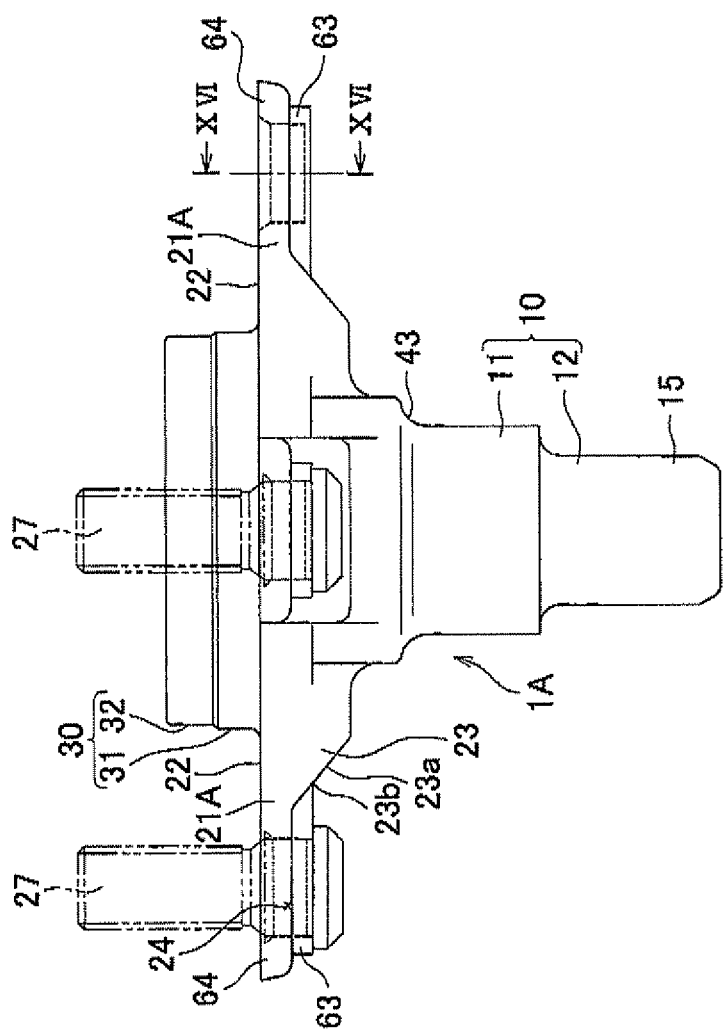
FIG. 15 is a side view that shows a flanged shaft member of a wheel bearing device, according to a fourth embodiment of the invention.
Figure 16:
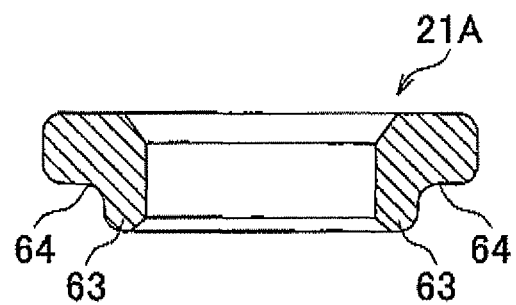
FIG. 16 is a sectional view taken along the line XVI-XVI in FIG. 15.

Next, a wheel bearing device according to a fourth embodiment of the invention will be described with reference to FIG. 15 and FIG. 16. As shown in FIG. 15, the shape of each flange portion 21A of a flanged shaft member 1A in the fourth embodiment differs from that of the first embodiment. In the fourth embodiment, as shown in FIG. 16, each flange portion 21A has a convex shape in circumferential cross section. Each flange portion 21A has a thick portion 63 in a region of the width of the bearing surface for the hub bolt 27, and has thin portions 64 at both circumferential ends. By so doing, the length necessary for fitting the hub bolt 27 is ensured, and the area of a necessary contact surface as a backup for a wheel outer-side brake rotor, thus reducing the volume of each flange portion 21A. In addition, as shown in FIG. 16, all edge portions present in the circumferential cross section of each flange portion 21A each have a radius of R2 or above to thereby improve the die life.

Note that the shape of the flanged shaft member 1A, other than the shape of each flange portion 21A, is identical with those of the first to third embodiments, and the manufacturing method for the flanged shaft member 1A, including bonderizing treatment and bonderlube treatment applied before cold forging, is identical with the manufacturing methods for the flanged shaft members 1 according to the first to third embodiments, so the detailed description is omitted.

According to the fourth embodiment, it is possible to further reduce the weight without impairing the strength of each flange portion.

Fifth Embodiment

Next, a wheel bearing device according to a fifth embodiment of the invention will be described with reference to FIG. 14. In the fifth embodiment, where the area in which the first molding die 71 contacts the second molding die 72, indicated by the shaded portion in FIG. 14, is Ss, it may be expressed as follows:

$$Ss = Sa - Sf$$

Then, in the fifth embodiment, Ss is configured to be larger than or equal to 5000 square millimeters and smaller than or equal to 6500 square millimeters. Note that this value is intended for a wheel bearing device for a 1.5-liter class automobile. Then, when Ss is smaller than 5000 square millimeters, the area in which the first molding die 71 contacts the second molding die 72 is small and, therefore, the dies more easily fracture. In addition, when Ss is larger than 6500 square millimeters, the flow area of steel material reduces and then flow characteristics of steel material deteriorate, so moldability of the flange portions deteriorates.

The other configuration of the fifth embodiment is similar to those of the first to fourth embodiments, and the other configuration of the manufacturing method for the wheel bearing device according to the fifth embodiment is similar to those of the manufacturing methods according to the first to fourth embodiments, so the description thereof is omitted.

According to the fifth embodiment, in extrusion of the flange portions 21 in secondary molding of cold forging, excessive load does not act on the dies and moldability of the flange portions 21 is favorable, so it is possible to achieve both the die life and the moldability.

Sixth Embodiment

Next, a wheel bearing device according to a sixth embodiment of the invention will be described.

A flanged shaft member configured as a wheel hub unit, which serves as the wheel bearing device, uses steel material that satisfies all the following conditions. That is, the mass content of carbon is 0.47% to 0.58%, the mass content of titanium is 20 ppm to 30 ppm, the mass content of copper is 0.10% to 0.20%, the mass content of nickel is 0.10% to 0.20%, the mass content of molybdenum is 0.75% to 0.85%, and the mass content of sulfur is 0.005% or below.

The other configuration of the sixth embodiment is similar to those of the first to fifth embodiments, so the description thereof is omitted.

In the thus configured wheel bearing device according to the fifth embodiment of the invention, the steel material, of which the content of carbon, and the like, falls within the above range, has good moldability in cold forging and possesses a surface hardness required of a bearing ring after induction hardening. Thus, the above steel material is desirable as a steel material that constitutes the flanged shaft member 1.

The other configuration of the manufacturing method for the wheel bearing device according to the sixth embodiment is similar to those of the manufacturing methods according to the first to fifth embodiments, so the description thereof is omitted.

With the thus configured manufacturing method for the wheel bearing device according to the sixth embodiment of the invention, the steel material that satisfies all the following conditions is used as the shaft-like material 60, which serves as the material for the flanged shaft member 1. That is, the mass content of carbon is 0.47% to 0.58%, the mass content of titanium is 20 ppm to 30 ppm, the mass content of copper is 0.10% to 0.20%, the mass content of nickel is 0.10% to 0.20%, the mass content of molybdenum is 0.75% to 0.85%, and the mass content of sulfur is 0.005% or below. Therefore, the shaft-like material 60 has good moldability in cold forging. In addition, the shaft-like material 60 is molded into the flanged shaft member 1, undergoes necessary turning and is then subjected to induction hardening. After that, the resultant flanged shaft member 1 has a surface hardness required of the bearing ring.

Here, when the mass content of carbon is lower than 0.47%, the steel material is soft and has good moldability in cold forging; however, the steel material cannot have a surface hardness required of the bearing ring even when it is subjected to induction hardening. Then, when the mass content of carbon exceeds 0.58%, the steel material is hard and brittle, so the steel material is not suitable for working by cold forging. Therefore, the mass content of carbon at least needs to be 0.47% to 0.58%.

Then, titanium has a property that prevents the grain size of the steel material from becoming coarse. When the mass content of titanium is 20 ppm to 30 ppm, the grain size of the steel material is prevented from becoming coarse, so the steel material has good moldability in cold forging and the desirable steel material is obtained.

Note that, when the mass content of titanium exceeds 30 ppm, titanium may precipitate to damage the balls of the bearing, so it is not desirable.

Copper, nickel and molybdenum each have a property such that, as the content increases, the grain size of the steel material reduces and the steel material softens. Then, when at least one of the conditions that the mass content of copper is 0.10% to 0.20%, that the mass content of nickel is 0.10% to 0.20% and that the mass content of molybdenum is 0.75% to 0.85%, is satisfied, the grain size of the steel material reduces, so moldability of the steel material in cold forging is good. Note that, as the content of any one of copper, nickel and molybdenum exceeds the upper limit of the corresponding one of the above ranges, costs increase because of additive copper, nickel or molybdenum, and, in addition, it is difficult to obtain a necessary surface hardness by induction hardening, so it is undesirable.

In addition, sulfur has a property such that, as the content increases, the steel material becomes brittle and easily fractures. When the mass content of sulfur is 0.005% or below, the steel material does not become brittle or easily fracture, so moldability of the steel material in cold forging is good. Note that, as the mass content of sulfur exceeds 0.005%, the steel material becomes brittle and easily fractures, so it is undesirable.

Seventh Embodiment

Figure 17:
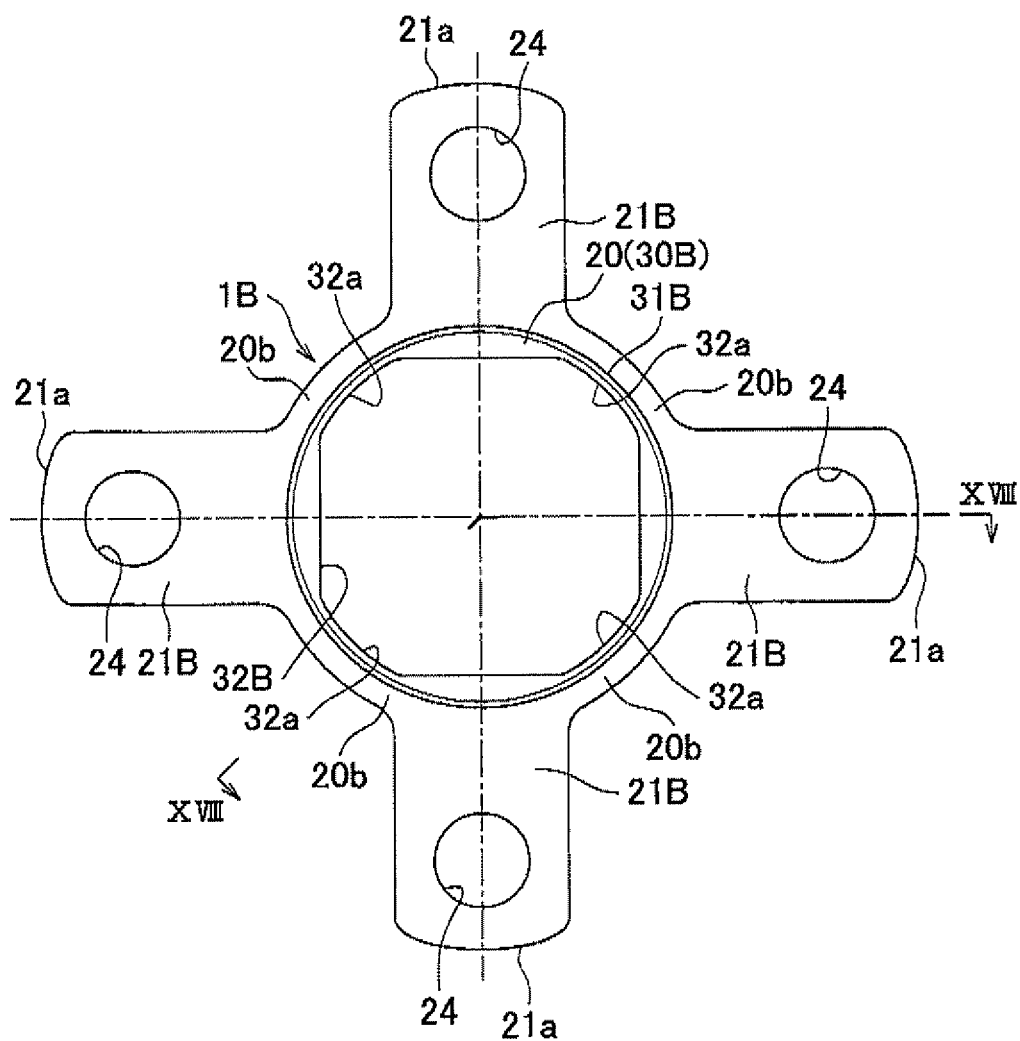
FIG. 17 is a plan view that shows a flanged shaft member of a wheel bearing device, according to a seventh embodiment of the invention.
Figure 18:
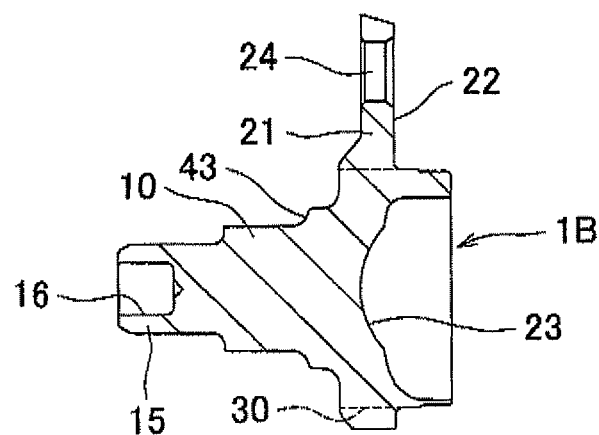
FIG. 18 is a sectional view taken along the line XVIII-XVIII in FIG. 17.

Next, a wheel bearing device according to a seventh embodiment will be described. In the seventh embodiment, as shown in FIG. 17 and FIG. 18, the shape of a fitting shaft portion 30B of a flanged shaft member 1B and the shape of a portion near a base portion of each flange portion 21B differ from those of the first to sixth embodiments. In the seventh embodiment, the fitting shaft portion 30B is formed so that portions near the base portions of the flange portions 21B are thick, and the other portions are thin. Then, the inner peripheral surface of the fitting shaft portion 3013 is formed into a polygonal shape corresponding to the number of the flange portions 21B. Then, each corner 32a of a forged recess 33B that forms the inner peripheral surface of the fitting shaft portion 3013 is formed in a circular arc shape. The radius r1 of each corner 32a is set to be substantially equal to the radius r2 of the outside diameter of a brake rotor fitting portion 31B of the fitting shaft portion 3013. By so doing, the life of the punch used in cold forging is ensured.

Then, flange-shaped flange proximal portions 20b are formed on the outer peripheral side of the fitting shaft portion 30B at locations at which no flange portions 21B are formed, and portions near the base portions of the flange portions 21B are smoothly connected to the flange proximal portions 20b and integrated with the flange proximal portions 20b. Note that the material for the flanged shaft member 1B, the shape of each flange portion 21B and the shape of a portion other than a portion near the base portion of each flange portion 21B are identical with those of the first to sixth embodiments, and a manufacturing method for the flanged shaft member 1B is also identical with the manufacturing methods for the flanged shaft members 1 according to the first to sixth embodiments, so the detailed description is omitted.

According to the seventh embodiment, it is possible to ensure flowability of steel material to the flange portions 21B and to reduce the thickness of the fitting shaft portion 30B at portions, other than portions near the base portions of the flange portions 21B, to which repeated stress is relatively hard to be applied. Thus, it is possible to ensure the strength of the flanged shaft member 1B while reducing the weight of the flanged shaft member 1B. In addition, by integrating the portions near the base portions of the flange portions 21B with the flange proximal portions 20b, it is possible to disperse the stress applied to the base portions of the flange portions 21B.

Eighth Embodiment

Next, a wheel bearing device according to an eighth embodiment of the invention will be described with reference to FIG. 19 and FIG. 20.

Figure 19:
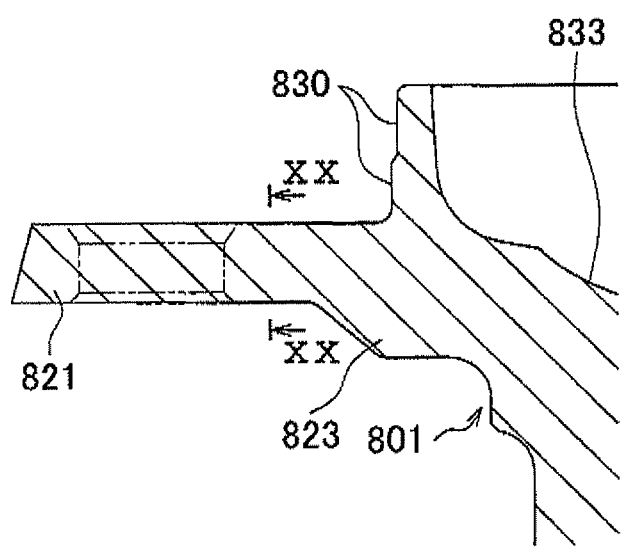
FIG. 19 is a longitudinal sectional view that shows a flange portion of a flanged shaft member of a wheel bearing device, according to an eighth embodiment of the invention.

As shown in FIG. 19, in the eighth embodiment as well, a plurality of flange portions 821 of a flanged shaft member 801 are formed by side extrusion when a forged recess 833 is formed at the center of the end surface of a fitting shaft portion 830 by cold forging.

In addition, as shown in FIG. 20, edge portions of the cross-sectional shape taken perpendicularly to the longitudinal direction of each flange portion 821 are formed in two type R-chamfered shapes, that is, edge portions 821e and edge portions 821f.

Specifically, as shown in FIG. 19 and FIG. 20, the edge portions 821e are formed on the thick portion 23 side of each flange portion 821, the thick portion 23 being present near the base portion of each flange portion 821, and the edge portions 821f are formed on the fitting shaft portion 830 side. In addition, each edge portion 821f is formed to have a rounded surface larger than that of each edge portion 821e.

The other configuration of the eighth embodiment is similar to those of the first to seventh embodiments, so the description thereof is omitted. In the thus configured wheel bearing device according to the eighth embodiment of the invention, with regard to the flange portions 821, each flange is formed with good moldability because the flowability of material during molding of the flange improves.

Next, a manufacturing method for the wheel bearing device according to the eighth embodiment of the invention will be described with reference to FIG. 21 and FIG. 22.

Figure 21:
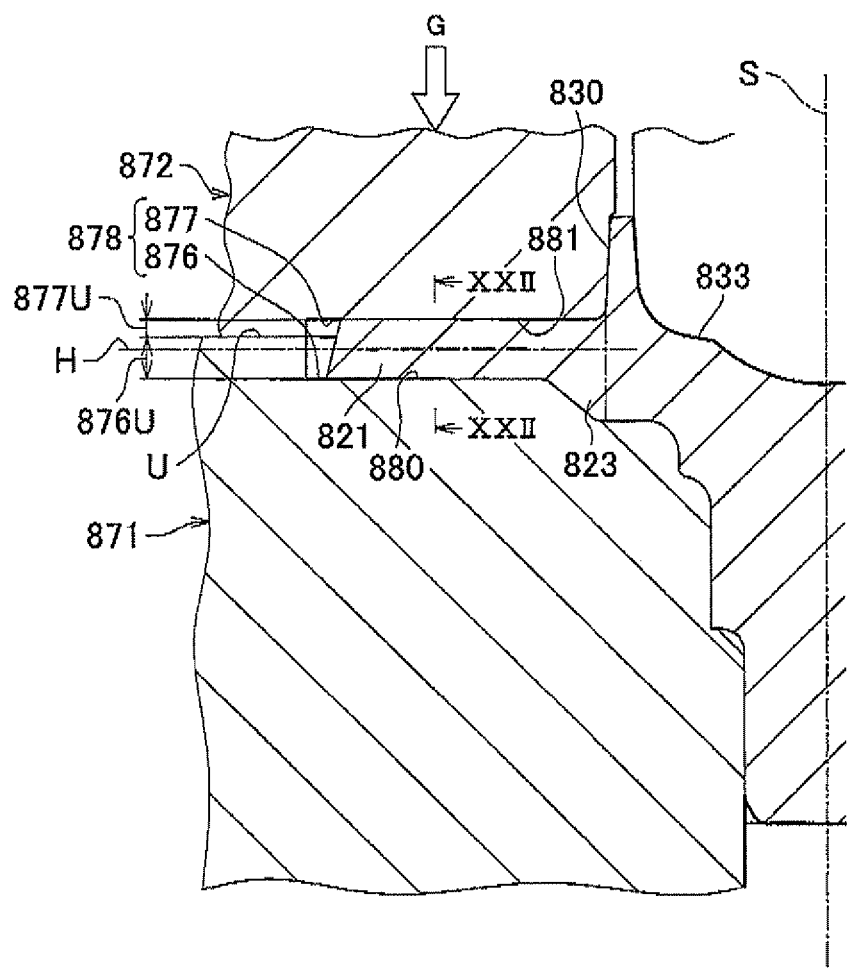
FIG. 21 is an enlarged longitudinal cross-sectional view that shows a flange molding portion of a cavity of a pair of first and second molding dies for cold forging of the wheel bearing device, according to the eighth embodiment of the invention.

As shown in FIG. 21, the flange portions 821 are formed by molding dies of a forging die apparatus, which are a first molding die 871 and a second molding die 872.

A parting position U of the first molding die 871 and the second molding die 872 is set at a location of a flange molding portion 878 corresponding to each flange portion 821 within a cavity formed by the first molding die 871 and the second molding die 872. The parting position U is set at an offset portion closer to the fitting shaft portion 830 side with respect to the center H of the flange portion 821 in the thickness direction. Specifically, a distance 877U from a guide surface 881 of the second molding die 872 to the parting position U is shorter than a distance 876U from a guide surface 880 of the first molding die 871 to the parting position U.

Figure 22:
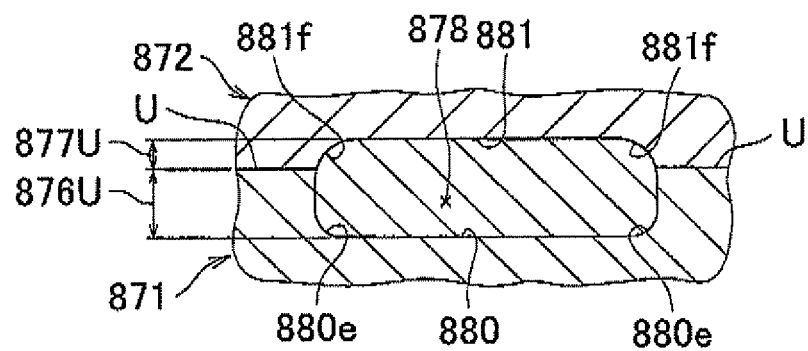
FIG. 22 is a sectional view taken along the line XXII-XXII in FIG. 21.

As shown in FIG. 21 and FIG. 22, each molding groove 876 of the first molding die 871 has rounded surfaces of edge portions 880e in correspondence with the R-chamfered shapes of the edge portions 821e (see FIG. 20) of the cross-sectional shape of each flange portion 821. In addition, each molding groove 877 of the second molding die 872 has rounded surfaces of edge portions 881f in correspondence with the R-chamfered shapes of the edge portions 821f (see FIG. 20) of the cross-sectional shape of each flange portion 821. The molding groove 876 of the first molding die 871 and the molding groove 877 of the second molding die 872 constitute each flange molding portion 878 to form each flange portion 821.

In addition, in the eighth embodiment, the guide surface 880 of each molding groove 876 of the first molding die 871 and the guide surface 881 of each molding groove 877 of the second molding die 872 are formed with a die structure with no relief portion. The other configuration of the manufacturing method for the wheel bearing device according to the eighth embodiment is similar to those of the manufacturing methods for the wheel bearing devices according to the first to seventh embodiments, so the description thereof is omitted.

With the thus configured manufacturing method for the wheel bearing device according to the eighth embodiment of the invention, it is possible to prevent concentration of material flow pressure in cold forging on the edge portions 881f of the cross-sectional shape of each flange molding portion 878. As a result, it is possible to improve the die life by preventing concentration of stress on the edge portions 881f of the cross-sectional shape of each flange molding portion 878 and, by extension, it is possible to reduce manufacturing costs of the wheel bearing device. In addition, the flowability of material during molding of each flange portion 821 improves, so it is possible to form the flange portions 821 having good moldability.

In addition, in the eighth embodiment, the guide surface 880 of each molding groove 876 of the first molding die 871 and the guide surface 881 of each molding groove 877 of the second molding die 872 are formed with a die structure with no relief portion. However, the parting position U of the first molding die 871 and the second molding die 872 is set at an offset portion closer to the fitting shaft portion 830 with respect to the center H of the flange portion 821 in the thickness direction, and the rounded surface of each edge portion 881f of each molding groove 877 of the second molding die 872 is formed to have a radius larger than that of each edge portion 880e of each molding groove 876 of the first molding die 871. By so doing, it is possible to prevent occurrence of fracture at the edge portions 881f of each molding groove 877 of the second molding die 872, so the life of the molding dies is improved.

Ninth Embodiment

Next, a manufacturing method for a wheel bearing device according to a ninth embodiment of the invention will be described with reference to FIG. 5 and FIG. 14.

Figure 14:
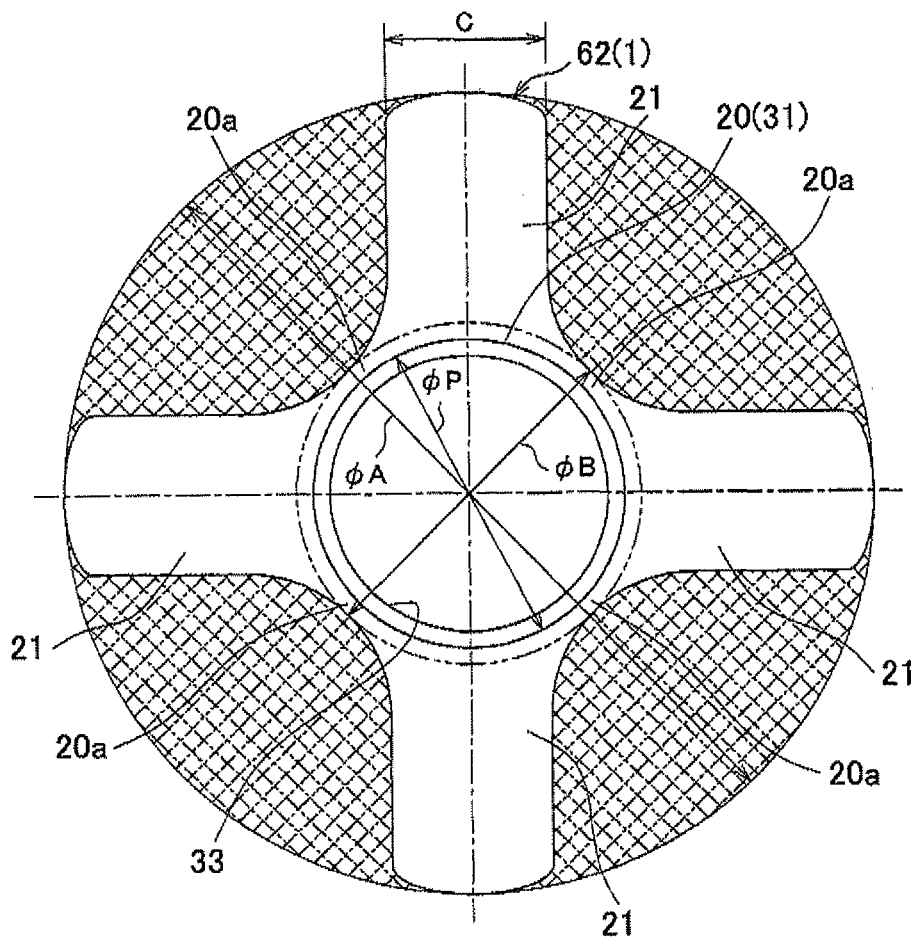
FIG. 14 is a plan view that shows a cold-forged secondary molding of a wheel bearing device from a fitting shaft portion side, according to the third embodiment of the invention.

As shown in FIG. 5 and FIG. 14, the manufacturing method for the wheel bearing device according to the ninth embodiment has a characteristic in specifying the axial size of the primary molding 61 molded in forward extrusion molding and the axial size of the secondary molding 62 molded in side extrusion molding. The manufacturing method for the wheel bearing device includes a cold forward extrusion molding process before a process in which the flange portions 21 are formed by side extrusion.

In the forward extrusion molding, the primary molding 61 formed of the shaft portion 10 (including the large-diameter portion 11, the small-diameter portion 12 and the end shaft portion 15 (in this state, no shaft end recess 16 is formed)) of the flanged shaft member 1 and the intermediate shaft portion 20 is formed. The intermediate shaft portion 20 is used to form the flange proximal portion 20a, formed at the base portions on both widthwise side surfaces of each flange portion 21, and the fitting shaft portion 30. Where the outside diameter of the intermediate shaft portion 20 formed in the forward extrusion molding process is φD, and the outside diameter of the flange proximal portion 20a formed in the side extrusion molding process is φB, the outside diameter φD of the intermediate shaft portion 20 and the outside diameter φB of the flange proximal portion 20a are set to satisfy the relationship $\phi D \geq \phi B \times 0.8$.

In other words, in the process before the process for forming the flange portions 21 by side extrusion, there is a cold forward extrusion molding process for forming the primary molding 61 that is formed of the shaft portion 10 of the flanged shaft member 1 and the intermediate shaft portion 20 used to form the flange proximal portion 20a, formed at the base portions on both widthwise side surfaces of each flange portion 21, and the fitting shaft portion 30. Then, the outside diameter φD of the intermediate shaft portion 20 formed in the forward extrusion molding process is 0.8 or more times as large as the outside diameter φB of the flange proximal portion 20a formed in the side extrusion molding process.

In addition, as shown in FIG. 5, the manufacturing method for the wheel bearing device according to the ninth embodiment has a characteristic in specifying the axial size of the primary molding 61 in forward extrusion molding.

That is, where the outside diameter of the intermediate shaft portion 20 of the primary molding 61 formed in the forward extrusion molding process is φD, and the outside diameter of the end shaft portion (in this state, no shaft end recess 16 is formed) of the shaft portion 10 is φE, the sectional area of the intermediate shaft portion 20 with the outside diameter of φD is $SD=(\phi D/2) \times (\phi D/2) \times \pi$, and the sectional area of the end shaft portion 15 of the shaft portion 10 with the outside diameter of (φE is $SE=(\phi E/2) \times (\phi E/2) \times \pi$.

Both the sectional areas are set to satisfy the relationship $(SD-SE)/SD \leq 0.85$.

In other words, the rate of reduction in cross section from the sectional area of the intermediate shaft portion 20 of the primary molding 61 formed in the forward extrusion molding process to the sectional area of the end shaft portion 15 of the shaft portion 10 is set to 0.85 or below. The other configuration of the manufacturing method for the wheel bearing device according to the ninth embodiment is similar to those of the manufacturing methods for the wheel bearing devices according to the first to eighth embodiments, so the description thereof is omitted. Thus, φD may be set to satisfy both the relationships $\phi D \geq \phi B \times 0.8$ and $(SD-SE)/SD \leq 0.85$.

With the thus configured manufacturing method for the wheel bearing device according to the ninth embodiment of the invention, by suppressing the amount of enlargement from the intermediate shaft portion 20 formed in the forward extrusion molding process to the flange proximal portion 20a formed in the side extrusion molding process, it is possible to reduce plastic strain of the distal end of each flange portion 21 formed in the side extrusion molding process. Then, it is possible to manufacture the cold-forged flanged shaft member 1 having a favorable distal end of each flange portion 21 with less fracture, so it is possible to reduce manufacturing costs of the wheel bearing device. In addition, it is possible to reduce the weight of the wheel bearing device.

In addition, when the rate of reduction in cross section from the intermediate shaft portion 20 formed in the forward extrusion molding process to the end shaft portion 15 of the shaft portion 10 is high, the hardness of the end shaft portion 15 of the shaft portion 10 increases because of work hardening. When the flanged shaft member 1 is assembled as the wheel bearing device together with various components, the end shaft portion 15 of the shaft portion 10 is swaged. At this time, when the hardness of the end shaft portion 15 of the shaft portion 10 is high, swaging performance decreases, so it is undesirable. However, with the above configuration, it is possible to suppress work hardening of the end shaft portion 15 of the shaft portion 10.

Note that the invention is not limited to the first to ninth embodiments, but it may be modified into various forms without departing from the scope of the invention.

For example, in the first embodiment, the relief portion 84 that keeps the gap S2 is formed between each molding groove 77 of the second molding die 72 of the forging die apparatus 70 and a portion opposite to the thick portion 23 side of each flange portion 21, the thick portion 23 being present near the base portion of each flange portion 21; instead, the invention may be embodied as a die structure with no relief portion 84.

As described above, a wheel bearing device according to a first aspect of the invention includes a flanged shaft member that includes a shaft portion to which a rolling bearing is assembled, a fitting shaft portion that is formed on one end side of the shaft portion and that is fitted to a center hole of a wheel, and a plurality of flange portions that extend radially outward on an outer peripheral surface located between the shaft portion and the fitting shaft portion and each of which has a bolt hole in which a hub bolt for fastening the wheel is arranged, wherein each flange portion is formed by side extrusion when a forged recess is formed at a center of an end surface of the fitting shaft portion by cold forging, and an edge portion of a cross-sectional shape taken perpendicularly to a longitudinal direction of each flange portion is formed in an R-chamfered shape.

With the above configuration, the plurality of flange portions are formed radially on the outer peripheral surface located between the shaft portion and the fitting shaft portion by cold side extrusion. Thus, it is possible to reduce manufacturing cost while reducing the weight.

In addition, the edge portion of the cross-sectional shape taken perpendicularly to the longitudinal direction of each flange portion is formed in an R-chamfered shape. Thus, when the flange portions are formed by cold side extrusion, the flange portions may be formed using a molding die having flange molding portions in each of which an edge portion is formed with a rounded surface in correspondence with the cross-sectional shape of each flange portion.

Therefore, it is possible to prevent concentration of material flow pressure on the edge portion of the cross-sectional shape of each flange molding portion of the molding die.

As a result, it is possible to improve the die life by preventing early fracture due to concentration of stress on the edge portion of the cross-sectional shape of each flange molding portion of the molding die and, by extension, it is possible to reduce manufacturing costs of the wheel bearing device.

A wheel bearing device according to a second aspect of the invention is configured so that, in the wheel bearing device according to the first aspect, the cross-sectional shape taken perpendicularly to the longitudinal direction of each flange portion is formed so that both side portions are thinner than a widthwise center portion, and the edge portion of the cross-sectional shape of each flange portion is formed in an R-chamfered shape.

With the above configuration, it is possible to reduce the weight by the amount by which both side portions are thinner than the widthwise center portion in the cross-sectional shape taken perpendicularly to the longitudinal direction of each flange portion.

In other words, the widthwise center portion of each flange portion is formed to have a desired thickness, and a through bolt hole is formed in the widthwise center portion. By so doing, it is possible to ensure the length for press-fitting the hub bolt while reducing the weight.

A wheel bearing device according to a third aspect of the invention is configured so that, in the wheel bearing device according to the first aspect, in the side extrusion through the cold forging, a molding die of a forging die apparatus is formed of a first molding die and a second molding die, a parting position of the first molding die and the second molding die is set at a location of a flange molding portion corresponding to each flange portion, within a cavity formed in the molding die of the forging die apparatus, the parting position is set at an offset portion closer to the fitting shaft portion side with respect to a center in a thickness direction of each flange portion, and each flange portion is formed by the molding die.

With the above configuration, in the cold side extrusion, the molding die of the forging die apparatus is formed of the first molding die and the second molding die. The parting position of the first molding die and the second molding die is formed at a location of the flange molding portion corresponding to each flange portion within the cavity formed in the molding die. The parting position is set at an offset portion closer to the fitting shaft portion side with respect to the center in the thickness direction of each flange portion.

By so doing, it is possible to prevent occurrence of fracture at the edge portion of each molding groove of the second molding die.

A fourth aspect of the invention provides a manufacturing method for a wheel bearing device that includes a flanged shaft member that includes a shaft portion to which a rolling bearing is assembled, a fitting shaft portion that is formed on one end of the shaft portion, that has a larger diameter than that of the shaft portion and that is fitted to a center hole of a wheel, and a plurality of flange portions that are located between the shaft portion and the fitting shaft portion, that extend radially outward and each of which has a through bolt hole in which a hub bolt for fastening the wheel is arranged. The manufacturing method includes: forming the flange portions by side extrusion on an outer peripheral surface between the shaft portion and the fitting shaft portion while forming a forged recess at a center of an end surface of the fitting shaft portion by a forging die apparatus for cold forging, wherein the flange portions are formed using a molding die of the forging die apparatus, wherein the molding die of the cold forging apparatus has a cavity in which a cross-sectional shape taken perpendicularly to a longitudinal direction of a flange molding portion corresponding to each flange portion is formed so that an edge portion is formed with a rounded surface in correspondence with the cross-sectional shape of each flange portion of the wheel bearing device according to the first aspect, and the molding die is used to form the flange portions.

With the above configuration, it is possible to easily manufacture the wheel bearing device according to the first aspect of the invention, and it is possible to reduce manufacturing costs of the wheel bearing device by improving the die life of the forging die apparatus.

A manufacturing method for a wheel bearing device according to a fifth aspect of the invention is configured so that, in the manufacturing method for a wheel bearing device according to the fourth aspect, the molding die of the forging die apparatus is formed so that, in the cross-sectional shape taken perpendicularly to the longitudinal direction of each flange molding portion of the molding die of the forging die apparatus, both side portions are smaller than a widthwise center portion in correspondence with the cross-sectional shape of each flange portion of the wheel bearing device according to the second aspect and the edge portion of the cross-sectional shape of each flange molding portion is formed with a rounded surface.

With the above configuration, it is possible to easily manufacture the wheel bearing device according to the second aspect.

A manufacturing method for a wheel bearing device according to a sixth aspect of the invention is configured so that, in the manufacturing method for a wheel bearing device according to the fourth aspect, the molding die of the forging die apparatus for cold forging is formed of a first molding die and a second molding die, a parting position of the first molding die and the second molding die is set at a location of the flange molding portion corresponding to each flange portion, within a cavity formed in the molding die of the forging die apparatus, and the parting position is set at an offset portion closer to the fitting shaft portion side with respect to a center in a thickness direction of each flange portion.

With the above configuration, the molding die of the forging die apparatus for cold forging is formed of the first molding die and the second molding die. The parting position of the first molding die and the second molding die is set at a location of the flange molding portion corresponding to each flange portion within the cavity formed in the molding die. The parting position is set at an offset portion closer to the fitting shaft portion side with respect to the center in the thickness direction of each flange portion.

By setting the parting position at an offset portion closer to the fitting shaft portion with respect to the center in the flange thickness direction, it is possible to prevent occurrence of fracture at the edge portion of each molding groove of the second molding die, so the life of the molding die is improved.

A manufacturing method for a wheel bearing device according to a seventh aspect of the invention is configured so that, in the manufacturing method for a wheel bearing device according to the fourth aspect, in a process before a process for forming the flange portions by the side extrusion, there is a cold forward extrusion molding process for forming a primary molding that is formed of the shaft portion of the flanged shaft member and an intermediate shaft portion used to form a flange proximal portion, formed at base portions on both widthwise side surfaces of each flange portion, and the fitting shaft portion, and, where the outside diameter of the intermediate shaft portion formed in the forward extrusion molding process is $\phi D$ and the outside diameter of the flange proximal portion formed in the side extrusion molding process is $\phi B$, the outside diameter $\phi D$ of the intermediate shaft portion and the outside diameter $\phi B$ of the flange proximal portion are set to satisfy the relationship $\phi D \geq \phi B \times 0.8$.

With the above configuration, by suppressing the amount of enlargement from the intermediate shaft portion formed in the forward extrusion molding process to the flange proximal portion formed in the side extrusion molding process, it is possible to reduce plastic strain of the distal end of each flange portion formed in the side extrusion molding process. Then, it is possible to manufacture the cold-forged flanged shaft member having a favorable distal end of each flange portion with less fracture, so it is possible to reduce manufacturing costs of the wheel bearing device. In addition, it is possible to reduce the weight of the wheel bearing device.

In other words, the above configuration may be expressed as follows. In the manufacturing method for a wheel bearing device according to the fourth aspect, in a process before a process for forming the flange portions by side extrusion, there is a cold forward extrusion molding process for forming a primary molding that is formed of the shaft portion of the flanged shaft member and an intermediate shaft portion used to form a flange proximal portion, formed at base portions of each flange portion on both widthwise side surfaces, and the fitting shaft portion, and the outside diameter $\phi D$ of the intermediate shaft portion formed in the forward extrusion molding process is 0.8 or more times as large as the outside diameter $\phi B$ of the flange proximal portion formed in the side extrusion molding process.

A manufacturing method for a wheel bearing device according to an eighth aspect of the invention is configured so that, in the manufacturing method for a wheel bearing device according to the fourth aspect, where the outside diameter of the intermediate shaft portion of a primary molding formed in the forward extrusion molding process is $\phi D$ and the outside diameter of an end portion of the shaft portion is $\phi E$, a sectional area SD of the intermediate shaft portion with the outside diameter of $\phi D = (\phi D/2) \times (\phi D/2) \times \pi$,
a sectional area SE of the end portion of the shaft portion with the outside diameter of $\phi E = (\phi E/2) \times (\phi E/2) \times \pi$,
both the sectional areas are set to satisfy the relationship $(SD-SE)/SD \leq 0.85$.

In addition, when the rate of reduction in cross section from the intermediate shaft portion formed in the forward extrusion molding process to the end portion of the shaft portion is high, the hardness of the shaft portion increases because of work hardening. When the flanged shaft member is assembled as the wheel bearing device together with various components, the end portion of the shaft portion is swaged. At this time, when the hardness of the end portion of the shaft portion is high, swaging performance decreases, so it is undesirable.

However, with the above configuration, it is possible to suppress work hardening of the end portion of the shaft portion.

In other words, the above configuration may be expressed as follows. In the manufacturing method for a wheel bearing device according to the fourth aspect, the rate of reduction in cross section from a sectional area of the intermediate shaft portion of a primary molding formed in the forward extrusion molding process to a sectional area of an end portion of the shaft portion is set to 0.85 or below.

The invention claimed is:

1. A wheel bearing device comprising:
   a flanged shaft member including a shaft portion in which a rolling bearing is assembled;
   a fitting shaft portion formed on one end side of the shaft portion and fitted to a center hole of a wheel; and
   a plurality of flange portions extending radially outward on an outer peripheral surface located between the shaft portion and the fitting shaft portion, and the plurality of flange portions including a through bolt hole in which a hub bolt for fastening the wheel is arranged, wherein
   each flange portion in the plurality of flange portions are formed through a side extrusion when a forged recess is formed by cold forging of a center at an end surface of the fitting shaft portion, and
   each flange portion includes an edge portion that is formed into a rounded surface, the edge portion being a cross-sectional shape of each flange portion, and the edge portion being perpendicular to a longitudinal direction of each flange portion.

2. The wheel bearing device according to claim 1, wherein the edge portion includes a plurality of side portions, the plurality of side portions being formed to be thinner than a widthwise center portion of each flange portion.

3. The wheel bearing device according to claim 1, wherein in the side extrusion, a molding die of a forging die apparatus includes a first molding die and a second molding die, a parting position of the first molding die and the second molding die being set at a location of a flange molding portion corresponding to each flange portion, the parting position being set within a cavity formed in the molding die of the forging die apparatus, the parting position being set at an offset portion closer to the fitting shaft portion with respect to a center in a thickness direction of each flange portion, and each flange portion is formed by the molding die of the forging die apparatus.

4. A manufacturing method for a wheel bearing device including a flanged shaft member having a shaft portion to which a rolling bearing is assembled, a fitting shaft portion formed on one end of the shaft portion, the fitting shaft portion having a larger diameter than the shaft portion and being fitted to a center hole of a wheel, and a plurality of flange portions being located between the shaft portion and the fitting shaft portion, the plurality of flange portions extending radially outward and having a through bolt hole in which a hub bolt for fastening the wheel is arranged, the manufacturing method comprising:

forming the plurality of flange portions through side extrusion on an outer peripheral surface between the shaft portion and the fitting shaft portion while forming a forged recess at a center of an end surface of the fitting shaft portion by a forging die apparatus for cold forging, wherein the plurality of flange portions are formed using a molding die of the forging die apparatus, the molding die of the forging die apparatus including a cavity in which a cross-sectional shape perpendicular to a longitudinal direction of a flange molding portion corresponding to one flange portion of the plurality of flange portions such that an edge portion of the one flange portion is formed with a rounded surface in correspondence with the cross-sectional shape of each flange portion of the wheel bearing device.

5. The manufacturing method for a wheel bearing device according to claim 4, wherein the molding die of the forging die apparatus includes a first molding die and a second molding die, a parting position of the first molding die and the second molding die being set at a location of the flange molding portion corresponding to each flange portion, the parting position being set within the cavity formed in the molding die of the forging die apparatus, and the parting position being set at an offset portion closer to the fitting shaft portion with respect to a center in a thickness direction of each flange portion.

6. The manufacturing method for a wheel bearing device according to claim 4, wherein in a process before the process for forming the plurality of flange portions by the side extrusion, there is a cold forward extrusion molding process for forming a primary molding that is formed of the shaft portion of the flanged shaft member and an intermediate shaft portion used to form flange proximal portions, formed at base portions of each flange portion on two widthwise side surfaces, and the fitting shaft portion, and where an outside diameter of the intermediate shaft portion formed in the cold forward extrusion molding process is $\phi D$ and an outside diameter of each flange proximal portion formed in the side extrusion molding process is $\phi B$, the outside diameter $\phi D$ of the intermediate shaft portion and the outside diameter $\phi B$ of each flange proximal portion are set to satisfy the relationship $\phi D \geqq \phi B \times 0.8$.

7. The manufacturing method for a wheel bearing device according to claim 6, wherein where the outside diameter of the intermediate shaft portion of the primary molding formed in the cold forward extrusion molding process is $\phi D$ and an outside diameter of an end portion of the shaft portion is $\phi E$, a sectional area SD of the intermediate shaft portion with the outside diameter of $\phi D = (\phi D/2) \times (\phi D/2) \times \pi$, a sectional area SE of the end portion of the shaft portion with the outside diameter of $\phi E = (\phi E/2) \times (\phi E/2) \times \pi$, both the sectional areas are set to satisfy the relationship $(SD-SE)/SD \leqq 0.85$.

8. The manufacturing method for a wheel bearing device according to claim 4, wherein where an outside diameter of an intermediate shaft portion of a primary molding formed in a cold forward extrusion molding process is $\phi D$ and an outside diameter of an end portion of the shaft portion is $\phi E$, a sectional area SD of the intermediate shaft portion with the outside diameter of $\phi D = (\phi D/2) \times (\phi D/2) \times \pi$, a sectional area SE of the end portion of the shaft portion with the outside diameter of $\phi E = (\phi E/2) \times (\phi E/2) \times \pi$, both the sectional areas are set to satisfy the relationship $(SD-SE)/SD \leqq 0.85$.

* * * * *